US008185250B2

(12) United States Patent
Sato

(10) Patent No.: US 8,185,250 B2
(45) Date of Patent: May 22, 2012

(54) POWER LOAD CONTROL SYSTEM FOR UTILITY POWER SYSTEM

(75) Inventor: Koichi Sato, Saratoga, CA (US)

(73) Assignee: Peoplewave, Inc., Cupertino, CA (US)

( * ) Notice: Subject to any disclaimer, the term of this patent is extended or adjusted under 35 U.S.C. 154(b) by 436 days.

(21) Appl. No.: 12/565,724

(22) Filed: Sep. 23, 2009

(65) Prior Publication Data

US 2011/0068946 A1    Mar. 24, 2011

(51) Int. Cl.
G05D 3/12 (2006.01)
G05D 5/00 (2006.01)
G05D 9/00 (2006.01)

(52) U.S. Cl. ....................................... 700/295
(58) Field of Classification Search ............... 700/295
See application file for complete search history.

(56) References Cited

U.S. PATENT DOCUMENTS

| | | | |
|---|---|---|---|
| 6,624,532 B1 * | 9/2003 | Davidow et al. | 307/39 |
| 6,882,904 B1 * | 4/2005 | Petrie et al. | 700/295 |
| 6,980,891 B2 * | 12/2005 | Nagafuchi et al. | 700/286 |
| 7,343,361 B2 * | 3/2008 | Peljto et al. | 705/412 |
| 7,715,951 B2 * | 5/2010 | Forbes et al. | 700/291 |
| 8,008,804 B2 * | 8/2011 | Capp et al. | 307/44 |
| 8,010,240 B2 * | 8/2011 | Mattiocco et al. | 700/296 |
| 8,010,812 B2 * | 8/2011 | Forbes et al. | 713/300 |
| 2003/0225483 A1 * | 12/2003 | Santinato et al. | 700/295 |
| 2008/0172312 A1 * | 7/2008 | Synesiou et al. | 705/34 |
| 2008/0177678 A1 * | 7/2008 | Di Martini et al. | 705/412 |
| 2009/0160187 A1 * | 6/2009 | Scholte-Wassink | 290/44 |
| 2009/0216387 A1 * | 8/2009 | Klein | 700/296 |
| 2009/0228154 A1 * | 9/2009 | Trias | 700/295 |
| 2009/0240382 A1 * | 9/2009 | Mitani et al. | 700/298 |
| 2010/0198713 A1 * | 8/2010 | Forbes et al. | 705/34 |
| 2010/0207448 A1 * | 8/2010 | Cooper et al. | 307/20 |
| 2010/0225452 A1 * | 9/2010 | Murdoch | 340/10.5 |
| 2010/0274408 A1 * | 10/2010 | Stiles et al. | 700/296 |
| 2011/0016063 A1 * | 1/2011 | Pollack et al. | 705/412 |
| 2011/0106328 A1 * | 5/2011 | Zhou et al. | 700/291 |
| 2011/0173109 A1 * | 7/2011 | Synesiou et al. | 705/34 |

OTHER PUBLICATIONS

Irie et al., "Frequency Regulation by Coordinated Control of Battery Energy Storage and Heat Pump in Power System with a Large Penetration of Wind Power Generation", 19th Annual Conference of Power & Energy Society, The Institute of Electrical Engineers of Japan, Sep. 24, 2008, pp. 28-5-28-6, Japan.

* cited by examiner

Primary Examiner — Ronald Hartman, Jr.
(74) Attorney, Agent, or Firm — Chen Yoshimura LLP

(57) ABSTRACT

The system frequency can be effectively and efficiently regulated within a permissive range by using a power load control system capable of matching a high frequency component of a total generated power to a variation of total power consumption of power equipments.

18 Claims, 18 Drawing Sheets

POWER LOAD CONTROL SYSTEM FOR UTILITY POWER SYSTEM

BACKGROUND OF THE INVENTION

1. Field of the Invention

The present invention relates to a power load control system capable of absorbing a variation of total power consumption of power equipments, such as heat pump water heaters, which matches to a high frequency component of the fluctuation of a total generated power caused by a variety of power generators, such as a wind power generator and a solar power generator which are known to have a high frequency component in its fluctuation of the generated power (here, the power being the averaged power which is averaged over once cycle). The present invention provides efficient ways to use a total generated power when it has relatively high frequency components in its generated power, and provides a safe-guard for a power supplying system to avoid undesirable deviation of the system frequency, for example.

2. Description of the Related Art

The electrical power supplier has major ways to generate electric powers, such as a nuclear power generation, a thermal power generation, and a hydraulic power generation. Here the frequency of the output power from the thermal power plant and the hydraulic power plant are controlled by using the feedback of the variation of the power consumption through the central power feeding controller. The system frequency is currently controlled by the following three ways: 1) Economic load Dispatching Control (EDC) which is a way of scheduling to generate the power which meets the power demand with the least cost in generating power by using connected power generators. EDC has the typical response time of 20 minutes or longer. 2) Load Frequency Control (LFC) which is a scheme to balance the generated power with the power demand by adjusting power outputs of power generators. LFC has the typical response time of several minutes or longer. 3) Governor Control which is done by adjusting the power of the generators by controlling the boiler pressure and the turbine speed of the thermal power generators. The Governor Control has the typical response time of 20 seconds or longer.

The electric powers generated by wind power generators and the solar power generators are examples of so-called clean energies. The wind power generators and the solar power generators can contribute to reducing the emission of the exhaust gases, the green house gases, which cause environmental problems. The electric powers generated by the wind power generators or the solar power generators are known to fluctuate in a short time range according to the weather conditions, and therefore have high frequency components in the fluctuation of the generated power which sometimes varies within a time range of less than about 10 seconds. None of the above mentioned ways to control the supplying system frequency, Economic load Dispatching Control (EDC), Load Frequency Control (LFC), and Governor Control, is able to respond properly to control the fluctuation of the total generated power within a short time range of less than about 10 seconds. Storing the high frequency component of the generated power by generators including the wind power generators and the solar power generators in batteries with a large capacity is one way to regulate the system frequency. But installing large capacity batteries in the power system is not a cost effective method with currently existing technologies. When a total generated power exceeds a total consumption of power in an instance, an excess of generated power is lost by a heat loss for example, and when a total generated power is short of a total consumption of power in an instance, a supply voltage may drop out of a predetermined voltage range. In both case, it happens that a total generated power is not consumed efficiently by power equipments.

SUMMARY OF THE INVENTION

Accordingly, the present invention is directed to a power consumption control system capable of creating a variation in the total power consumption of power equipments in a short time range which matches the high frequency component of the fluctuation of the generated power caused by power generators that include wind power generators, or the solar power generators, or the like, that substantially obviate one or more of the problems due to limitations and disadvantages of the related art.

An object of the present invention is to provide a power consumption control system capable of creating a variation in the total power consumption in a short time range that matches the high frequency component in the fluctuation of the generated power of the wind power generators and the solar power generators or the like, in order to maintain the proper system frequency and to realize effective and efficient usage of the overall powers.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present invention provides a power consumption control system of a power system for regulating a system frequency, a frequency of a power system which varies depending on a balance between a generated power and power consumption, comprising:

an electrical energy meter measuring a generated power of an electric power generator;

a control box controlling a power equipment; and a control center being disposed in at least one location, said control center receiving information of said generated power from said electrical energy meter through an upstream communication line, said upstream communication line connecting said electrical energy meter and said control center, said control center calculating a total generated power of said electric power generator, said control center extracting a high frequency component of said total generated power of said electric power generator, said control center communicating with said control box through a command communication line, said control center matching a variation of total power consumption of said power equipment to an amount of said high frequency component of said total generated power of said electric power generator.

It is to be understood that both the foregoing general description and the following detailed description are exemplary and explanatory, and are intended to provide further explanation of the invention as claimed.

DETAILED DESCRIPTION OF THE PREFERRED EMBODIMENTS

In the following, preferred embodiments of the present invention will be explained in detail with reference to attached figures. In one aspect, embodiments of the present invention have a feature in which a variation of total power consumption of power equipments in a short time range is controlled to be matched to a total generated power that has a high frequency component in its fluctuation due to a variety of power generators including power generators such as wind power generators and solar power generators which typically generate relatively rapidly fluctuating power outputs.

(1) Embodiment A

Figure 1:
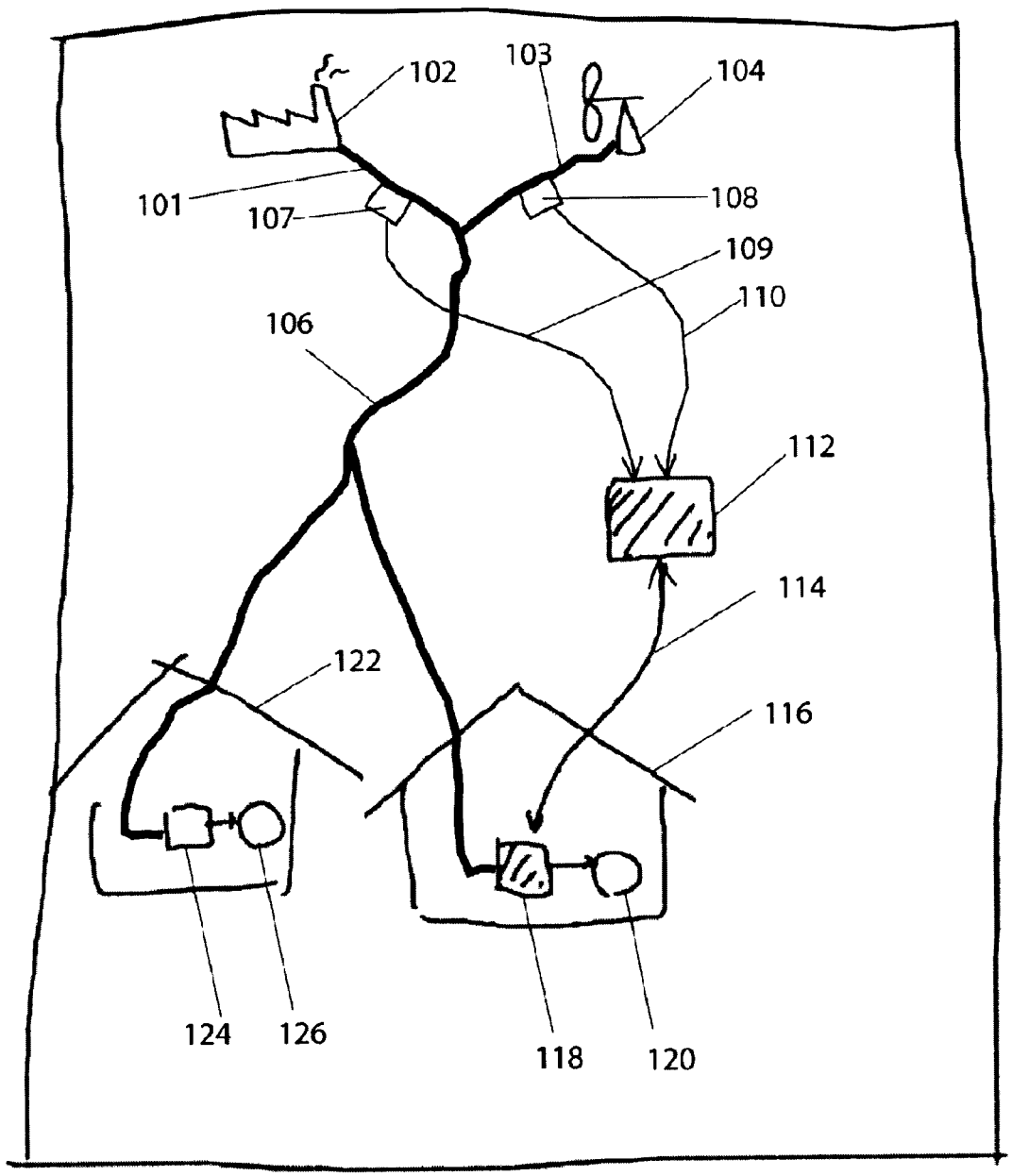
FIG. 1 is a schematic diagram of an embodiment showing elements of a power system.

FIG. 1 is a schematic diagram of an embodiment A showing two kinds of power generators. One is a power generator 102 such as a nuclear power plant, a thermal power plant, and a hydraulic power plant. Generated powers by a nuclear power plant, a thermal power plant, and a hydraulic power plant usually do not generate power which has a high frequency fluctuation in its power (the power being averaged over one cycle) which varies in less than about 10 seconds. Another is a power generator 104 such as a wind power generator or a solar power generator, which has fluctuated power outputs depending on weather conditions at their location (which may vary within a time range less than about 10 seconds or so)

Generated power is transferred through a power feed line 101, 103, and 106 to consumer houses 116 and 122. An electrical energy meter 107 is attached to a power feed line 101. An electrical energy meter 108 is attached to a power feed line 103. Electrical energy meters 107, 108 measure generated powers by power generators 102 and 104, respectively, as a function of time which sampling interval is much shorter than ten seconds. Information of the generated power measured by the electrical energy meter 107, 108 are sent through a power communication lines 109 and 110 to a control center 112. A control center 112 communicates with a control box 118 which controls the power equipment 120 in a consumer's house 116 through a command communication line 114. A control box 118 controls a power consumption of a power equipment 120 in communication with a control center 112 through a command communication line 114. Examples of a communication method between a control center 112 and a control box 118 include, but are not limited to, a wired and/or wireless Internet connection and other broadband wireless or wired connections, for example. Also, wireless communications such as Z-wave may be used for communication between the control box and the power equipment. Z-wave is a wireless communication technology designed for home automation by using remote control of home power equipments.

In the present embodiment, a power equipment 120 (referred hereafter to as "a controllable power equipment") which is controlled by a control box 118 in a consumer's house 116 has two kinds of settings of power load levels. One kind of the power equipment has a variable power load level in a range between 0% (OFF) and 100% (fully turned ON). Another kind of the power equipment has power load levels only at 100% (ON) or at 0% (OFF). Here, a control box 118 is connected to a control center 112 through a command communication line 114.

On the other side, in a consumer's house 122, power consumption of a power equipment 126 is controlled by a controller 124 which has no communication line with a control center 112. A set of a power equipment 126 and a controller 124 in a consumer's house 122 is an example in which a power equipment is not involved in matching a variation of total power consumption in a short time range to a total generated power by using commands from a control center 112.

High frequency components in the fluctuation of the total generated power by power generators 102 and 104 are substantially matched to an amount of variation of total power consumption of a power equipment 120 when a control center 112 controls an amount of variation of total power consumption of the power equipment 120 by using electrical power meters 107, 108 and the control box 118.

A schematic diagram in FIG. 1 is extremely simplified for an explanation purpose, but any elements in FIG. 1 may be multiplied in the embodiment A. Since a control center 112 controls an amount of variation of total power consumption of power equipment 120 in a short time range, and there exists equal chance to have positive and negative variation equally, a resulting net effect is cancelled out in a long time range, and effects of a control center in adjusting power consumption in a short time range will not be felt by a customer who uses a power equipment with a control box.

An example of a power equipment 120 in FIG. 1 is a heat pump water heater. A heat pump water heater is used to obtain hot water efficiently for residential use. Although installation cost of a heat pump water heater is larger than that of an electric resistance water heater currently, the cost is expected to be reduced dramatically with advancement in the technology development of heat pump water heaters. Because the heat is transferred from a source such as ambient air or the ground soil of the earth into water in a heat pump water heater, and the heat is not created by the electric resistance, less energy is needed to produce hot water. The energy efficiency of water-heating in a heat pump water heater is far greater than 100%.

There exists an alternative method to control a power consumption of a power equipment by changing a frequency of a supplied AC power to a power equipment. A control center controls a power consumption of a power equipment variably only when a power equipment is ON when a power equipment has power consumption levels at ON or OFF. This way of controlling a power consumption of a power equipment is called as a hybrid method.

Figure 2:
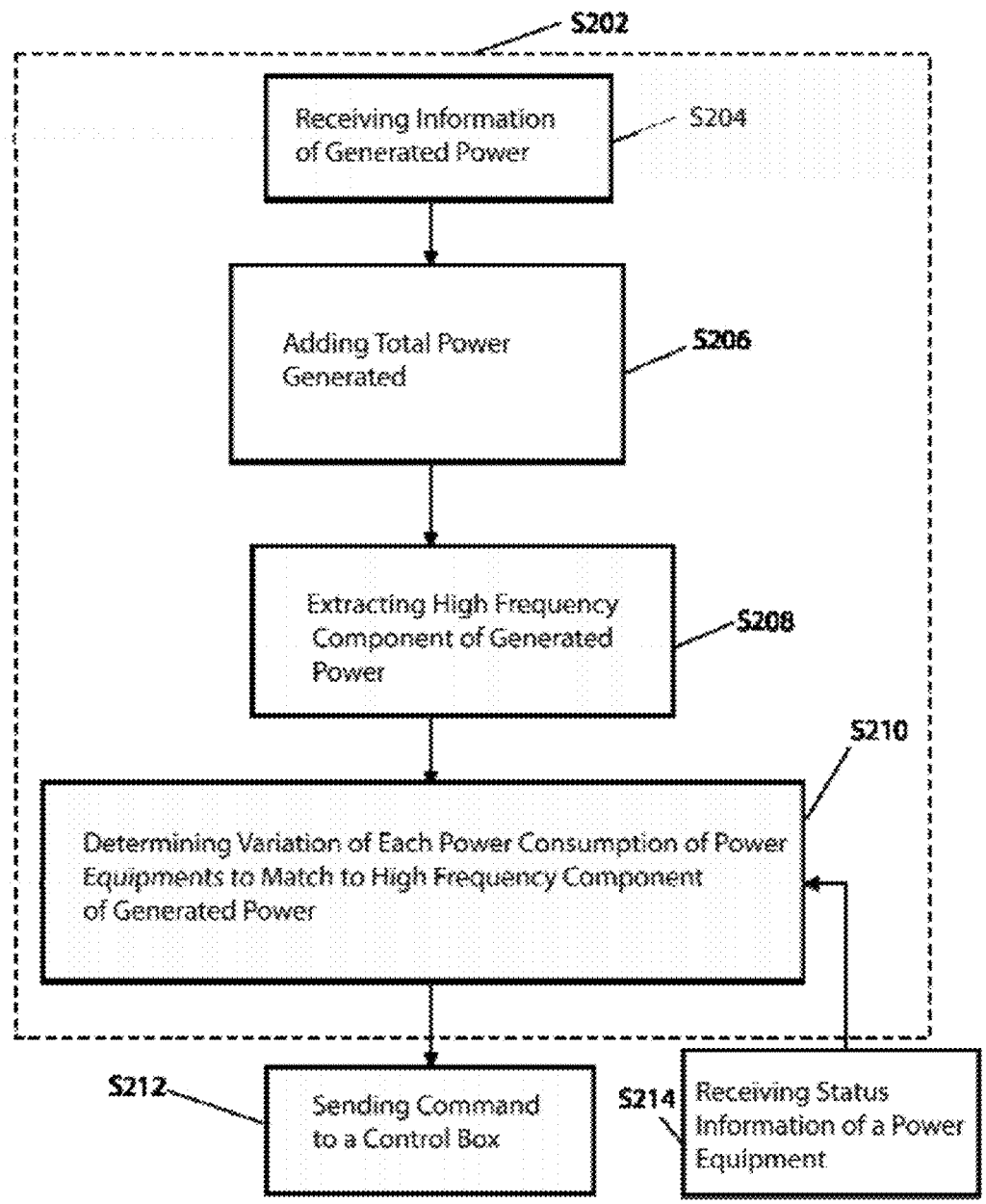
FIG. 2 is a diagram showing processes of a control center.

FIG. 2 is a diagram showing examples of processes of a control center. S202 shows a set of processes happening in a control center. In a process S204, information of generated power from electrical energy meters 107 and 108 are received. In a process S206, an amount of total generated power is obtained as a function of time. In a process S208, high frequency components of a total generated power (more accurately speaking, high frequency components in the fluctuation of the total generated power, the power being averaged over one cycle of the system frequency) are extracted. A high frequency component of a total generated power varies in a short time range, in less than about ten seconds, for example. In a process S210, each power consumption in a power equipment in a short time range is determined by a control center by using information on a high frequency component of a total generated power at a sampling time, status information of power equipments, a maximum power consumption, a variable power consumption level, and using monitored water temperature, for a heat pump, for example. Using an appropriate algorithm to determine each power consumption in a power equipment in a short time range, a control center matches a variation of total power consumption by power equipments in a short time range to a high frequency component in the fluctuation of a total power generated. In general, an absolute value of a fraction of variation of a total power consumption to a sum of maximum power consumption of power equipments is typically a level of about 1% and 10% in its maximum.

An example of an algorithm to determine each power consumption in a power equipment in a short time range in the embodiment A is the following. In the embodiment A, a power equipment has a variable power consumption level between 0% (OFF) and 100% (fully turned ON), and a control center sends a command of power consumption in a short time range to each control box depending on a kind of power equipment. Assuming that w is a fraction of power consumption of a power equipment with respect to a maximum power consumption of a power equipment, $W_a$, a control center knows exactly how much power consumption can be added to or reduced from the power consumption. For a heat pump water heater, power consumption is not increased when water temperature of a heat pump water heater is at a maximum temperature in a setting of a heat pump water heater. A control center determines a variable p ($-1 \leq p \leq 1$) and send a command to a control box to change power consumption of a power equipment by $p \cdot W_a$.

Assuming that $P_h$ is a difference between a total generated power in a short time range and a low frequency component of a total generated power, a control center determines the fractional value p, such that a total sum of $p \cdot W_a$ of individual power equipment is equal to $P_h$. Since the added or reduced power consumption in a power equipment happens in a short time range, and excesses and recesses of a total generated power with respect to a low frequency component of a total generated power are usually cancelled out in a long time range, the added or reduced power consumption in a power equipment in a short time range cannot appear in a power bill of a consumer, and an individual change of power consumption in a power equipment in a short time range is usually too small to be felt by a consumer.

When the absolute value of a fractional value of p is small, p is approximated by a ratio of a difference between a total generated power in a short time range and a low frequency component of a total generated power, $P_h$, to a sum of maximum power consumption, $W_a$. In this case, a correction to a fractional value p is made, in considering cases that ($w+p \cdot W_a$) exceeds $W_a$ or ($w+p \cdot W_a$) is smaller than 0. The correction is described in more detail later.

Because power consumption of a power equipment is monitored by a control center, a PID (proportional, integral, and differential) feedback is applied to power consumption of a power equipment when power consumption of a power equipment in a command of a control center is not fully done.

In a process 212, a command from a control center is sent to a control box which controls a power equipment. In a process 214, status information of a power equipment is received by a control center. An Internet communication and the Z-wave technology, for example, may be used for a communication between a control box and a control center.

Figure 3:
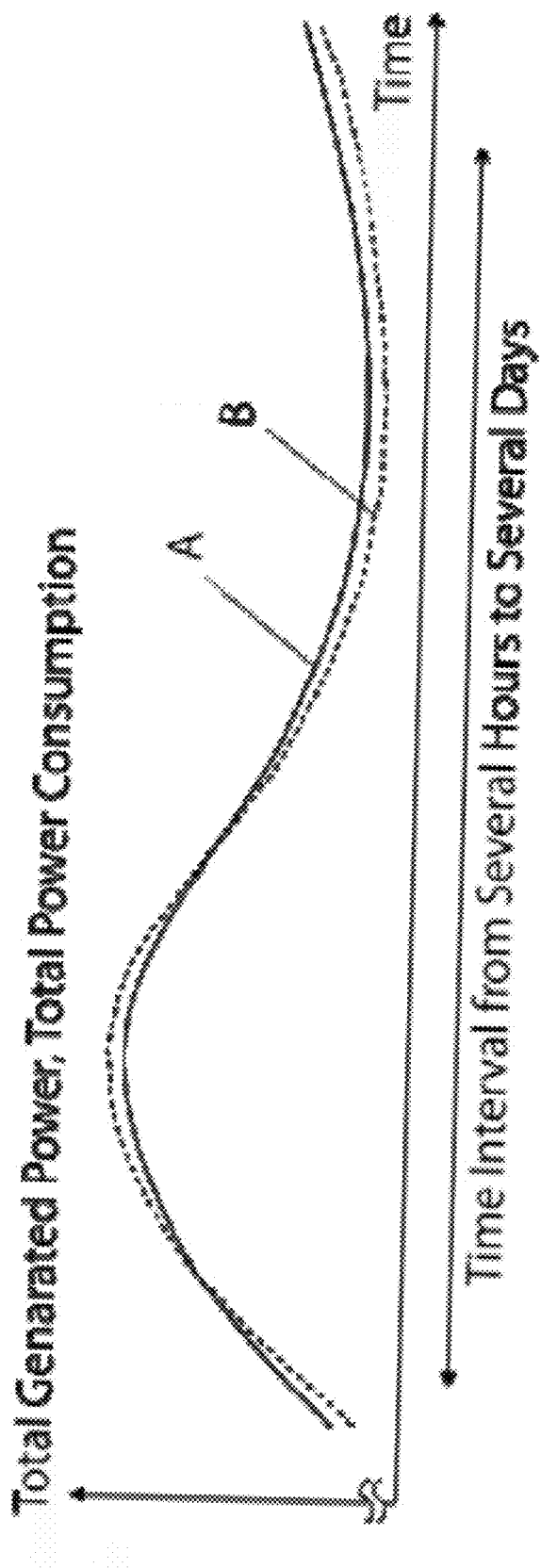
FIG. 3 is a diagram showing an example of a total generated power and total power consumption in a time interval from several hours to several days (a long term) which do not have a high frequency component in the fluctuation of the generated power.

FIG. 3 is a graph showing examples of a total generated power and total power consumption as a function of time in a time range of several hours to several days (a long term). The curve A shows an example of a total generated power as a function of time in a time range of several hours to several days. The curve B shows an example of total power consumption as a function of time in a time range of several hours to several days. In this example, a generated power has no high frequency component of generated power. A high frequency component of a total generated power and total power consumption are either averaged out or a high frequency component of power consumption is removed locally by using a power inverter and large capacity batteries, for example, and there exists no high frequency component of power consumption by a set of selected power equipments in this exemplary system.

Figure 4:
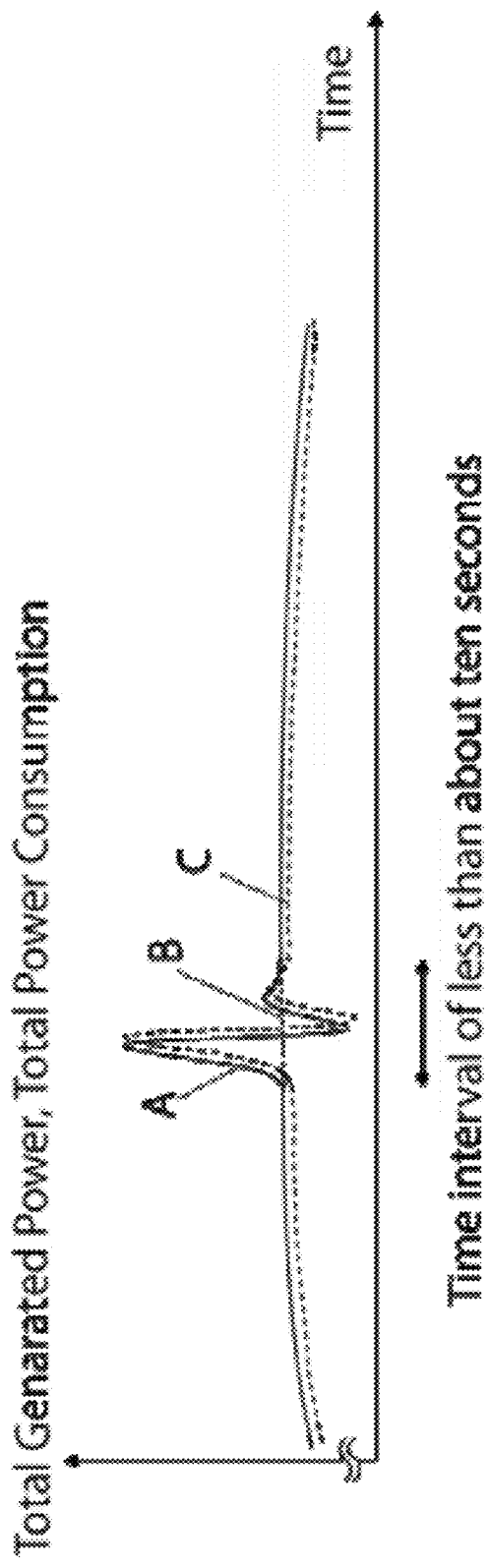
FIG. 4 is a diagram showing an example of a total generated power and total power consumption in a time interval of less than about 10 seconds (a short term) which have high frequency components in the fluctuation of the generated power.

FIG. 4 is a graph showing fluctuations of a total generated power and total power consumption as a function of time in a time range of less than about ten seconds (a short term). The curve A shows a total generated power which has a high frequency component of generated power. A high frequency component of a total generated power in FIG. 3 is above or below the curve B which shows a low frequency component of the total generated power. The curve C shows total power consumption in the power system which is matched to the total generated power which has a high frequency component of generated power and which is shown in the curve A. When a total generated power exceeds a low frequency component of a total generated power, power consumption of power equipments is increased in a short time range by a control center. And when a total generated power is lower than a low frequency component of a total generated power, power consumption of power equipments is reduced in a short time range by a control center.

Figure 5:
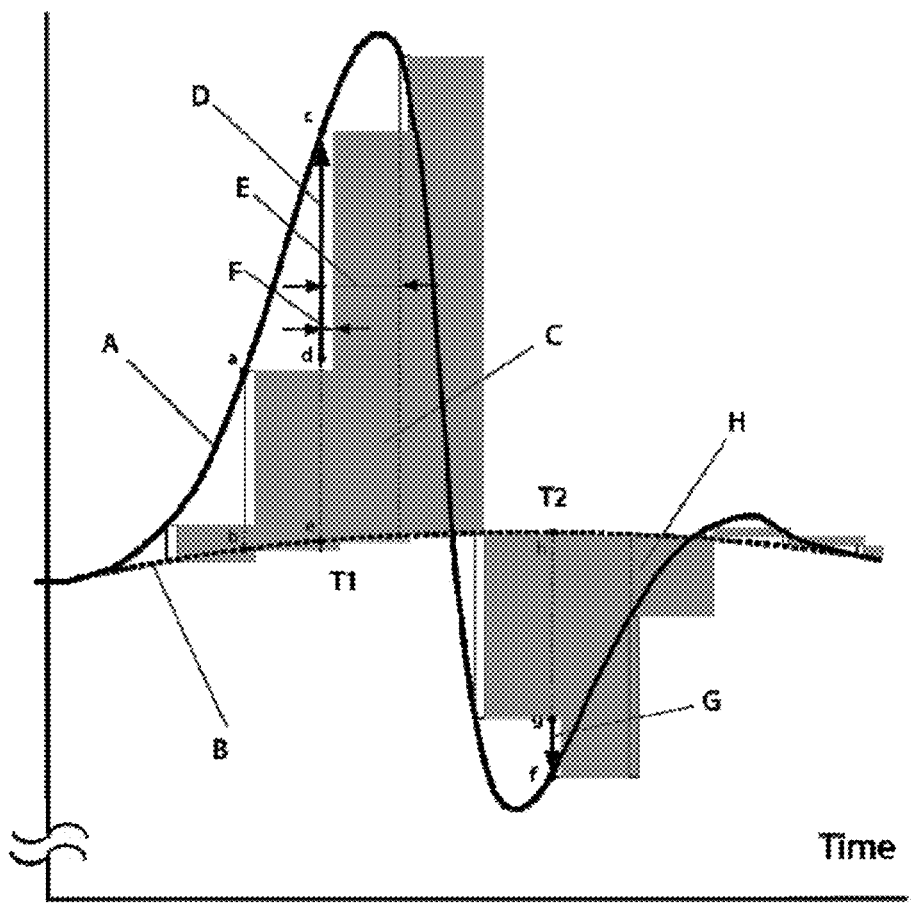
FIG. 5 is a diagram showing an example of a total generated power and total power consumption in a time interval of less than about 10 seconds, showing an exemplary way to control total power consumption by controlling power consumption of power equipments.

FIG. 5 is a graph showing a total generated power, a low frequency component of a total generated power, and total power consumption as a function of time in a time range of less than about ten seconds (a short term). The curve A shows a total generated power as a function of time in a short time range. The curve B shows a low frequency component of a total generated power as a function of time.

At a time at T1, the total generated power shown by the curve A, exceeds a low frequency component of the total generated power shown by the curve B, by an amount shown by a length of a line segment c-e. A control center sends out commands to control boxes to increase total power consumption by power equipments by a positive amount shown by an arrow D. Here, the size of an arrow D is an amount corresponding to a difference of lengths of line segments, c-e, and a-b. A time delay which is shown by F between a time at T1 when a high frequency component of a total generated power is measured and a time when a power which corresponds to a length of an arrow D is consumed by power equipments is typically less than 0.5-1 second. The total power consumption which was increased at a time T1 lasts for an interval which is shown by E, the cycle time of this feedback scheme. A grey area C shows total power consumption by power equipments as a function of time, when increasing commands of power consumption of power equipments are sent to control boxes by a control center.

Likewise, at a time T2, a total generated power which is shown by a curve A, is smaller than a low frequency component of a total generated power which is shown by a curve B, by an amount shown by a length of a line segment h-f. A control center sends out commands to control boxes to reduce total power consumption by power equipments by a negative amount shown by a length of an arrow G. A total power consumption which was decreased at a time T2 lasts for an interval which is shown by E, the cycle time. A grey area H shows power consumption by power equipments as a function of time, when decreasing commands of power consumption by power equipments are sent to control boxes by a control center.

Figure 6:
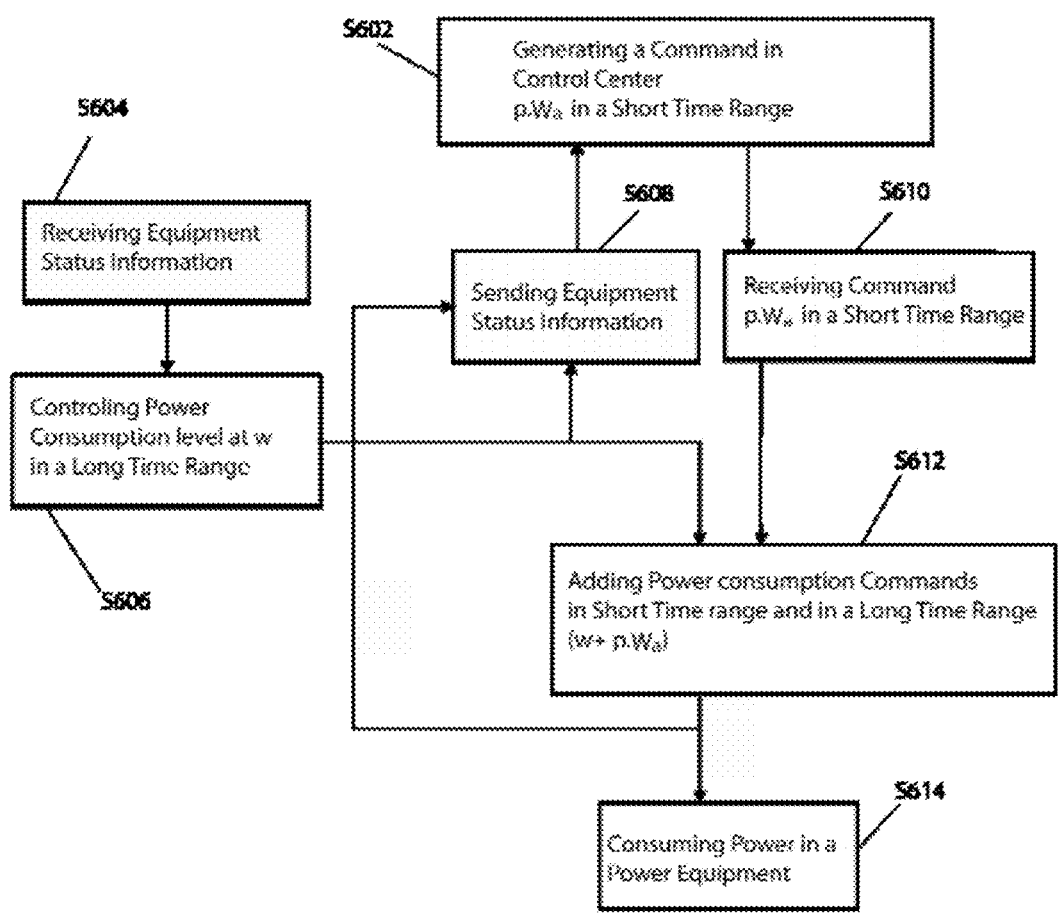
FIG. 6 is a diagram of processes in a control box which controls power consumption of a power equipment in a short time range and in a long time range in the embodiment A when a power equipment has a variable power load level in a range between 0% and 100%, and a bi-directional communication exists between a control center and a control box.

FIG. 6 is a diagram showing processes in a control box which controls power consumption of a power equipment in a short time range and in a long time range in an embodiment A when a control center sends commands to each control box depending on a kind of power equipment, and when a power equipment has a variable power consumption level between 0% (OFF) and 100% (fully turned ON).

In a process S604, information on a power equipment status is received by a control box. Examples of information on equipment status are maximum power consumption, a power consumption level, and a heated water temperature, for a heat pump water heater. In a process S606, a control box determines a level of power consumption, w, in a long time range.

S602 is a process that a command is generated for a power equipment to increase or decrease a level of power consumption, w, by an amount $p \cdot W_a$ in a control center. Here a variable p ($-1 \leq p \leq 1$) is a fraction of power consumption in short time range to a maximum power consumption of a power equipment, $W_a$. A control center sends a command to a control box to change power consumption of the power equipment by $p \cdot W_a$.

In a control box, S610 shows a process of receiving a command from a control center. In a process S612, a fraction, w, of power consumption to a maximum power consumption which is determined in a process S606 in a long range is added to power consumption in a short time range, $p \cdot W_a$. In a process S614, the added power consumption level, $(w+p \cdot W_a)$, is realized in a power equipment which receives a control command from a control box.

Figure 7:
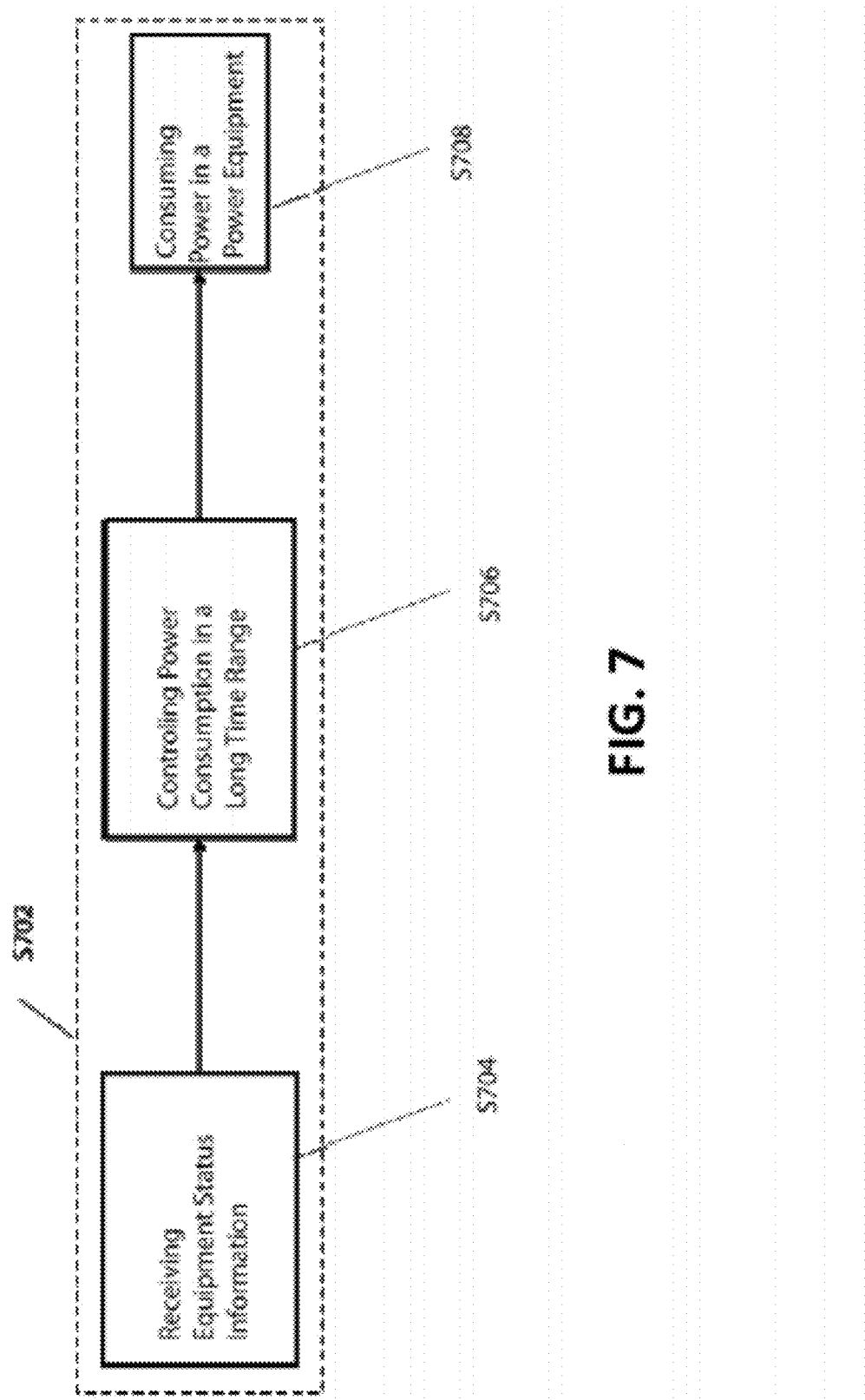
FIG. 7 is a diagram of processes of a control box and a power equipment which has no function of being controlled by a control center.

FIG. 7 is a diagram of processes of a controller and a power equipment which has no function of being controlled by a control center. A sum of processes is shown by S702. In a process S704, power equipment status information, such as a power consumption level, maximum power consumption, a heated water temperature for a heat pump water heater, for example, is received. In a process S706, a control command for a long time range to set a fraction of power consumption or to set a heated water temperature at a value is prepared. In a process S706, commanded power consumption is realized in a power equipment.

Figure 8:
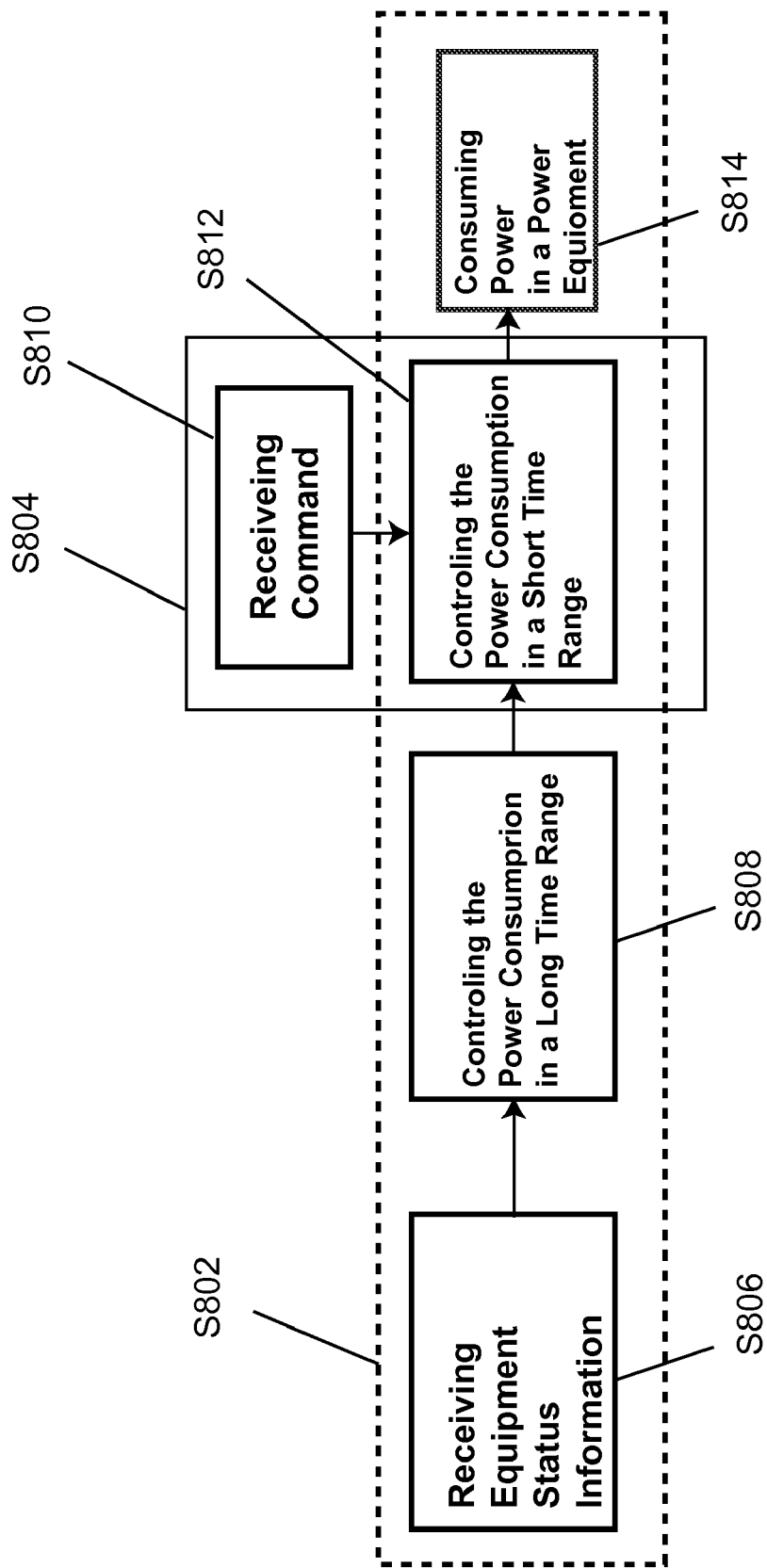
FIG. 8 is a diagram of processes of a control box and a power equipment which can contribute to a power consumption in a short time range with or without communicating to a control center.

FIG. 8 is a diagram of processes of a control box and a power equipment which can contribute to a variation of power consumption in a short time range which is matched to a high frequency component of a total generated power with or without communicating to a control center. A sum of processes S802 in FIG. 8 is different from a sum of processes S702 in FIG. 7 by having additional processes S804 in between processes S808 and S814.

In a process S806, equipment status information, such as a fraction of power consumption, a maximum power consumption, a heated water temperature, for a heat pump water heater, for example, is received. In a process S808, a control command for a long time range to set a fraction of power consumption or to set water temperature is prepared. The added process S804 includes a process S810, receiving a command from a control center, and a process S812, combining a control command in a long time range and a control command in a short time range which is sent from a control center. In a process S814, commanded power consumption is realized in a power equipment.

Because the high frequency components in the fluctuation of the total power can be substantially matched by the total power consumption by appropriately controlling variable power equipment in the manner described above, efficient and economic usage of the power generated is realized.

(2) Embodiment B

Figure 9:
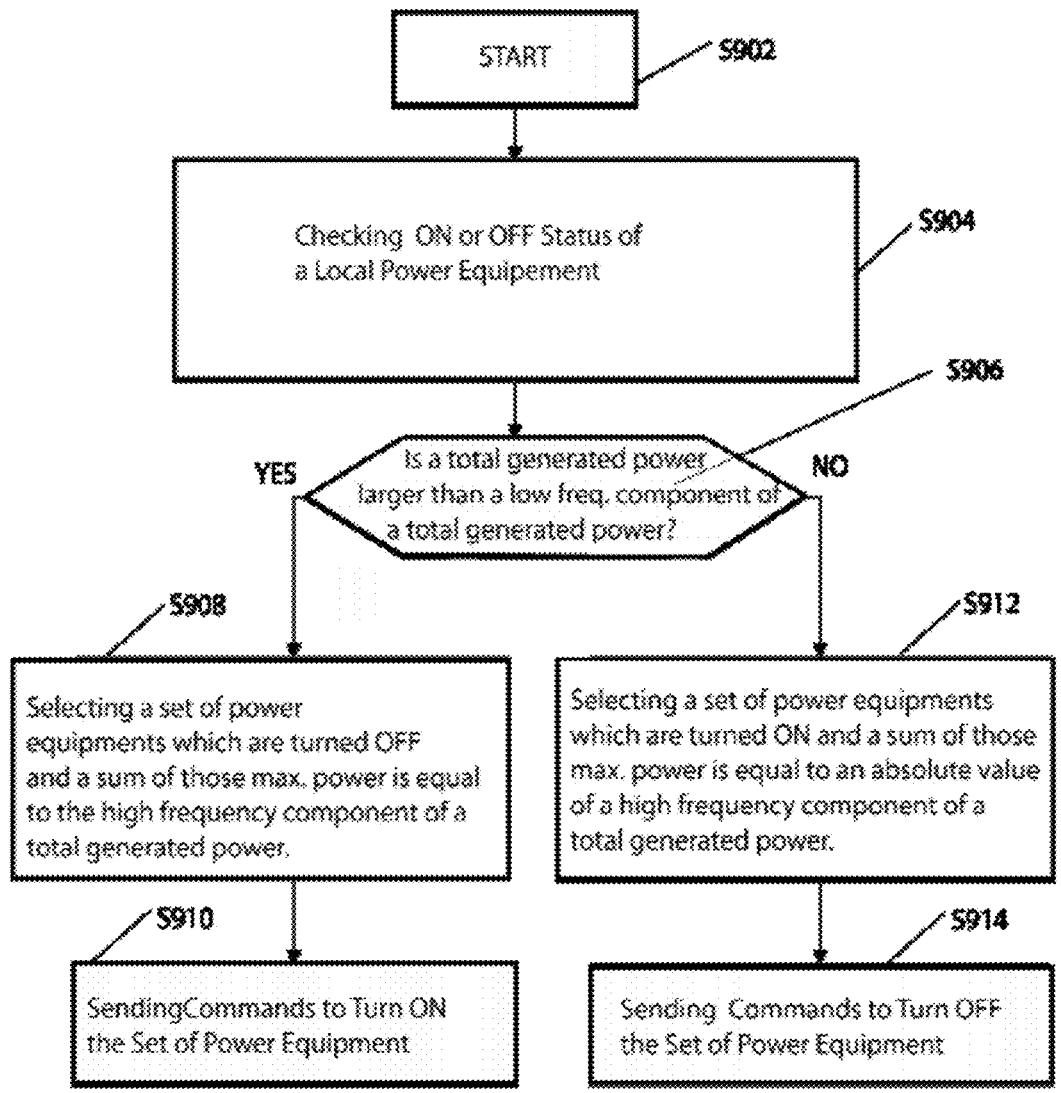
FIG. 9 is a diagram showing processes in a control center to prepare a command for an embodiment B when a power equipment has power load levels only at 0% or at 100%, and when a bi-directional communication exists between a control center and a control box exists.

In embodiment B, a control system of matching a variation of total power consumption in a short time range to a high frequency component of a total generated power differs from that in embodiment A as follows:
a2) a power equipment has only ON or OFF power consumption levels, rather than having a variable power consumption level between 0% (OFF) and 100% (fully turned ON),
b2) an example algorithm in a control center which is shown in FIG. 9 to match a variation of total power consumption in a short time range to a high frequency component of a total generated power in embodiment B differs from an example algorithm in embodiment A.

FIG. 9 shows processes to determine commands in a control center to be sent to each control box which controls power equipments. A process S902 shows a start of the exemplary algorithm. In a process S904, ON or OFF statuses of all power equipments are checked in a control center by using updated status information being sent from control boxes. In a process S906, a condition is checked whether a total generated power in a short time range exceeds a low frequency component of a total generated power or not.

If a total generated power in a short time range exceeds a low frequency component of a total generated power, in a process S908, a set of power equipments which are currently turned OFF are randomly selected such that a sum of maximum power consumption of those selected power equipments is equal to or within a predetermined limit with an excess of a total generated power in a short time range with respect to a low frequency component of a total generated power. In a process S910, commands are sent to a set of selected control boxes to turn the power ON.

Figure 10:
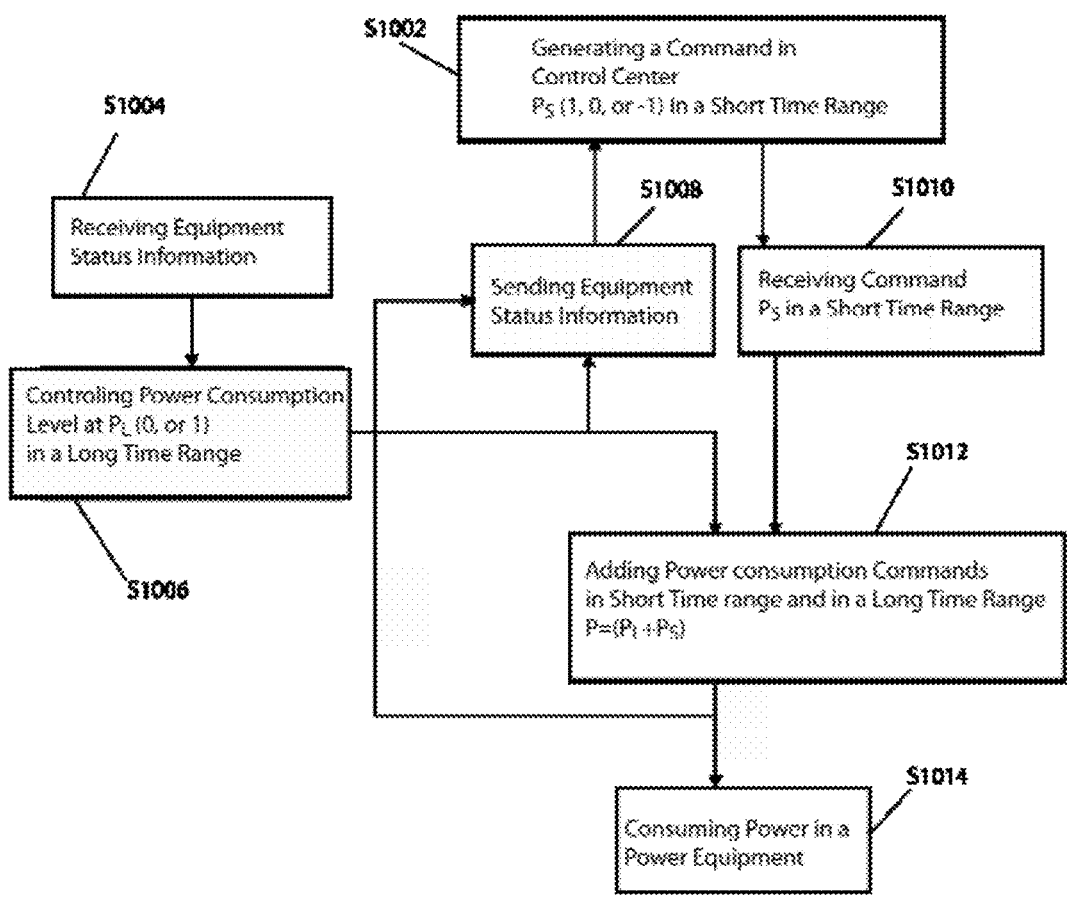
FIG. 10 is a diagram of processes in a control box which controls power consumption of a power equipment in a short time range and in a long time range in the embodiment B.

If a total generated power in a short time range is short of a low frequency component of a total generated power, in a process S912, a set of power equipments which are currently turned ON are randomly selected such that a sum of maximum power consumption of those power equipments is equal to or within a predetermined limit with the shortage of a total generated power in a short time range with respect to a low frequency component of a total generated power. In a process S914, commands are sent to a set of selected control boxes to turn the power OFF.

c2) Processes that are to be performed in a control box according to the present embodiment are shown in FIG. 10. FIG. 10 is a diagram of processes in a control box which controls power consumption of a power equipment in a short time range and in a long time range in the embodiment B when a control center sends commands to each control box depending on a kind of power equipment, and when a power equipment has ON or OFF power consumption levels.

In a process S1004, information on a power equipment status is received by a control box. In a process S1006, a control box determines a control variable $P_L$ on a level of power consumption in a long time range. Here $P_L$ is 0 (OFF) or 1 (ON).

S1002 is a process that a command is generated in a control center which is described in b2). A control variable in a short time range on a power consumption level, $P_S$, is 1 (turning ON), 0 (doing nothing), or −1 (turning OFF). In a process S1010, a control variable in a short time range, $P_S$, is received by a control box. In a process S1012, a control variable P is obtained by adding a control variable in a long time range, $P_L$, and a control variable in a short time range, $P_S$. An added control variable P is ON when $(P_L+P_S)$ is positive, and P is OFF when $(P_L+P_S)$ is 0 or negative. In a process S1014, an added control variable P is realized in a power consumption in a power equipment.

There exists an alternative method to control a power consumption of a power equipment by changing a frequency of a supplied AC power to a power equipment when a power equipment is ON. A control center controls a power consumption of a power equipment variably only when a power equipment is ON. This way of controlling a power consumption of a power equipment is called as a hybrid method. This method of controlling the power consumption level of a power equipment can be likewise implemented in the systems described with reference to Embodiment A and Embodiment B above.

(3) Embodiment C

Figure 11:
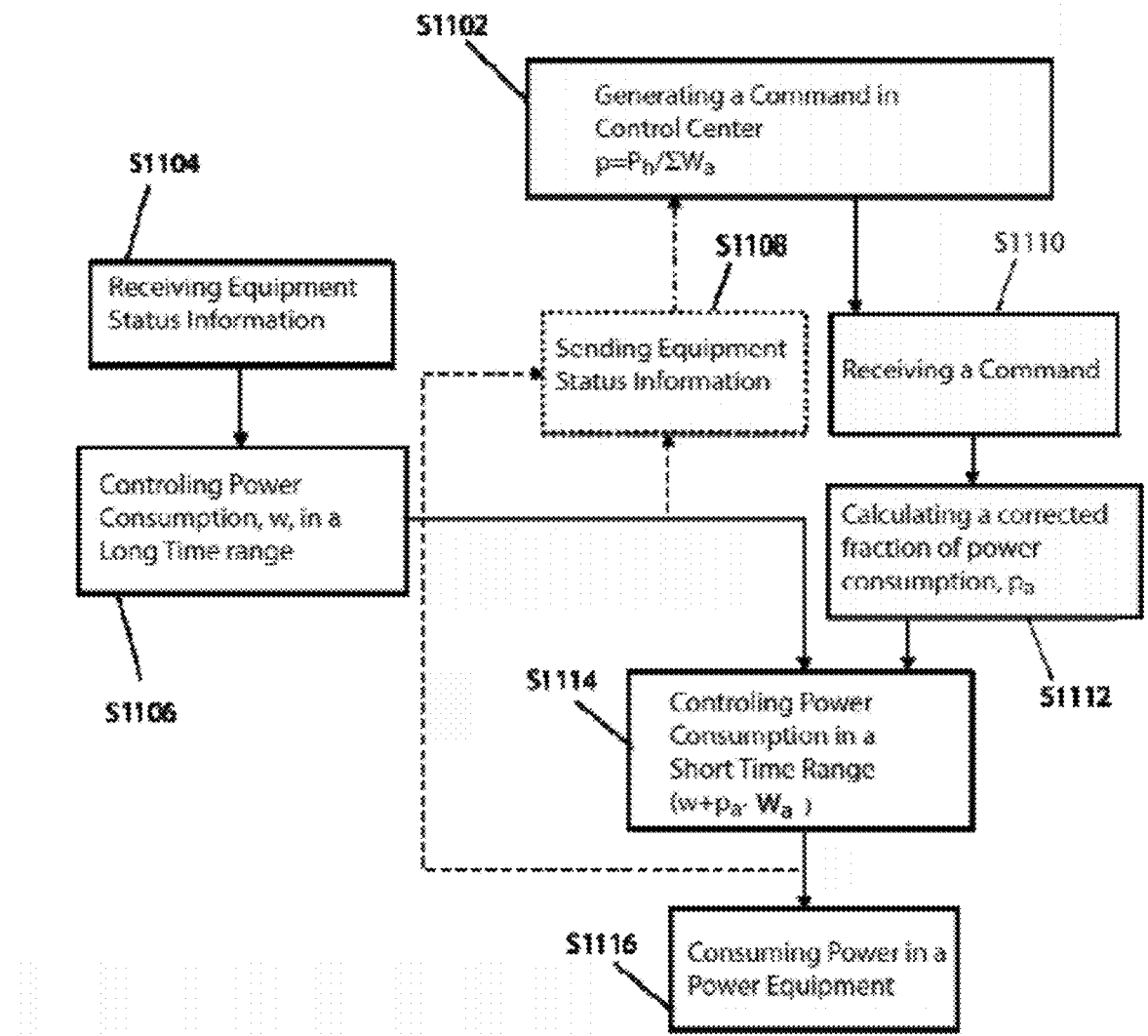
FIG. 11 is a diagram of processes in a control box which controls power consumption of a power equipment in a short time range and in a long time range in an embodiment C when a control center sends a common command to all control boxes, and when a power equipment has a variable power consumption level between 0% (OFF) and 100% (fully turned ON).

In embodiment C, a control system of matching a variation of total power consumption in a short time range to a high frequency component of a total generated power is different from that in embodiment A by the following:
a3) A control center sends a common value as a command to all power boxes which controls power equipments.
b3) An example of the common value is a fraction, p, of a high frequency component of a total generated power, $P_h$, to a sum of maximum power consumption in power equipments, $\Sigma W_a$. Here p is given by $P_h/\Sigma W_a$.
c3) Processes to be performed in a control box according to this embodiment is shown in FIG. 11. FIG. 11 is a diagram of processes in a control box which controls power consumption of a power equipment in a short time range and in a long time range in an embodiment C when a control center sends a common value as a command to all control boxes and a power equipment has a variable power consumption level between 0% (OFF) and 100% (fully turned ON).

In a process S1104, information on a power equipment status is received by a control box. In a process S1106, a control box determines a level of power consumption, w ($0 \leq w \leq W_a$), in a long time range.

S1102 is a process that a common fraction p is generated in a control center and sent to all control boxes. In an example algorithm, p is given by $P_h/\Sigma W_a$. Here, $P_h$ is a difference between a total generated power in a short time range and a low frequency component of a total generated power. An example of $P_h$ is shown by an amount corresponding to a length of a line segment c-e in FIG. 5.

In a control box, S1110 shows a process of receiving a command from a control center. In a process S1112, a corrected fraction, $p_a$, is calculated in considering possible cases when $(w+p \cdot W_a)$ is negative, or $(w+p \cdot W_a)$ is larger than $W_a$, depending on the value p and the probability distribution function u(w), where $$\int_0^1 u(x)dw=1$$

Here w ($0 \leq w \leq W_a$) is a power consumption level of a power equipment in a long time range. The detailed correction is described below.

In a process S1114, a power consumption level, w, in a long time range is added to $p_a \cdot W_a$ which is a product of a corrected fraction of power consumption in a short time range and a maximum power consumption of a power equipment. In a process S1116, the added power consumption level, $(w+p_a \cdot W_a)$, is realized in a power equipment which receives a control command from a control box.

Figure 12:
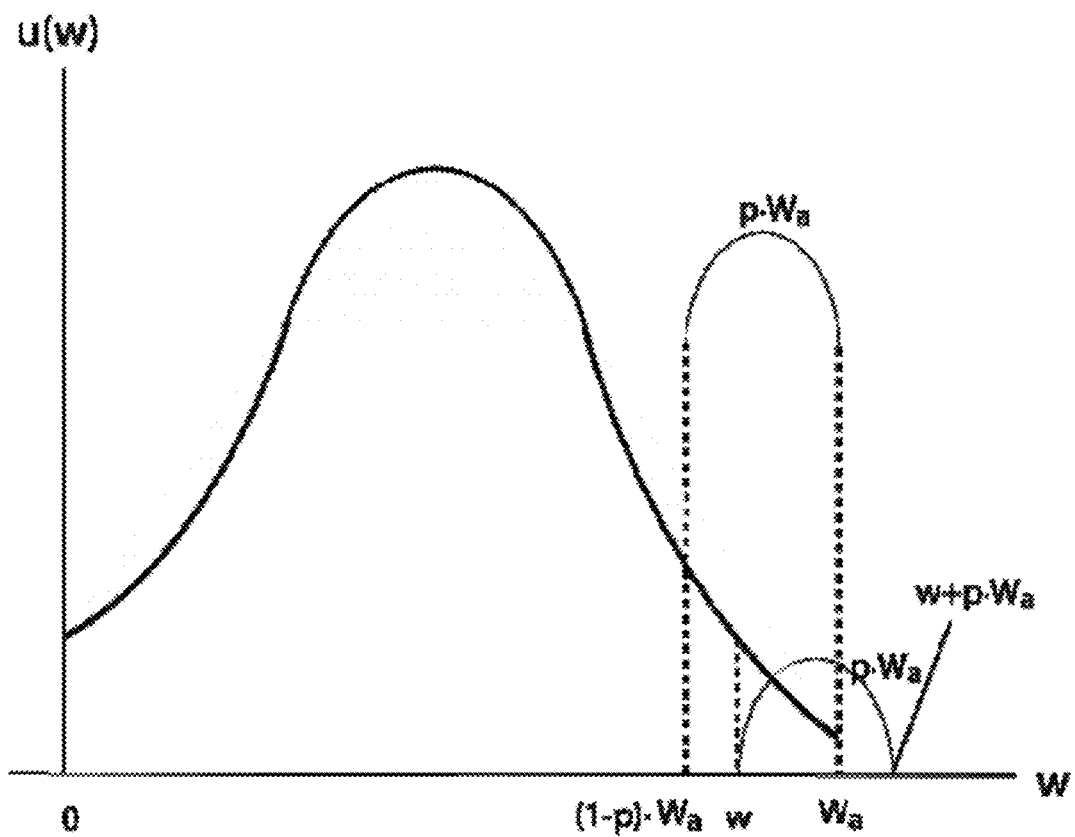
FIG. 12 is a graph for calculating corrected power consumption by a power equipment in a short time range in a control box for a power equipment when a total generated power in a short time range exceeds a low frequency component of a total generated power in the embodiment C.

FIG. 12 is a graph showing a probability distribution function u(w), a command from a control center, p ($=P_h/\Sigma W_a$), and a power consumption level variable, w ($0 \leq w \leq W_a$), when p is positive (when a total generated power in a short time range is larger than a low frequency component of a total generated power) and when $(w+p \cdot W_a)$ is larger than $W_a$. In this case, a corrected fraction, $p_a$, is given by:

$$p \int_0^{1-p} u(w) dw + \int_{1-p}^1 u(w)(1-w) dw = p \cdot \frac{p}{p_a} \quad (p \geq 0)$$

Here, a corrected fraction, $p_a$, is larger than a variable p which is sent from a control center.

Figure 13:
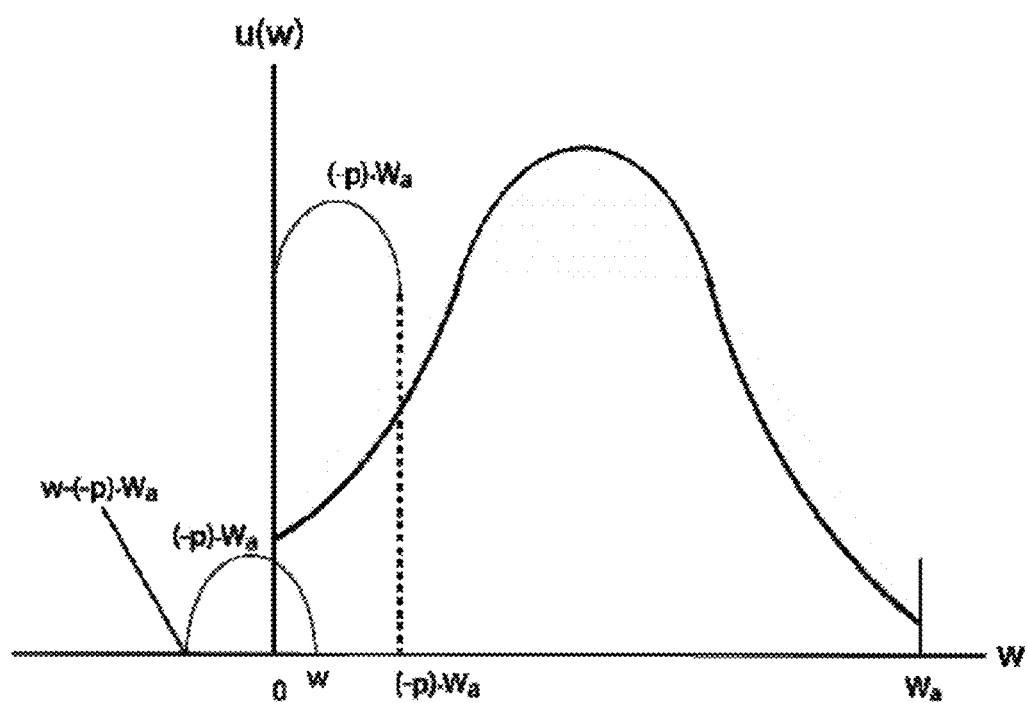
FIG. 13 is a graph for calculating corrected power consumption by a power equipment in a short time range in a control box for a power equipment when a total generated power in a short time range is short of a low frequency component of a total generated power in the embodiment C.

FIG. 13 is a graph showing a probability distribution function u(w) and p ($=P_h/\Sigma W_a$) and w ($0 \leq w \leq W_a$) when p is negative (when a total generated power in a short time range is smaller than a low frequency component of a total generated power) and when $(w+p \cdot W_a)$ is less than 0. In this case, a corrected fraction, $p_a$, is given by:

$$\int_0^{-p} u(w) w \, dw + (-p) \int_{-p}^1 u(w) dw = (-p) \cdot \frac{(-p)}{p_a} \quad (p < 0)$$

Here, the absolute value of a corrected fraction, $p_a$, is larger than the absolute value of a variable p which is sent from a control center.

According to this embodiment, efficient and effective power consumption management can be realized with a simpler control center system, for example.

(4) Embodiment D

Figure 14:
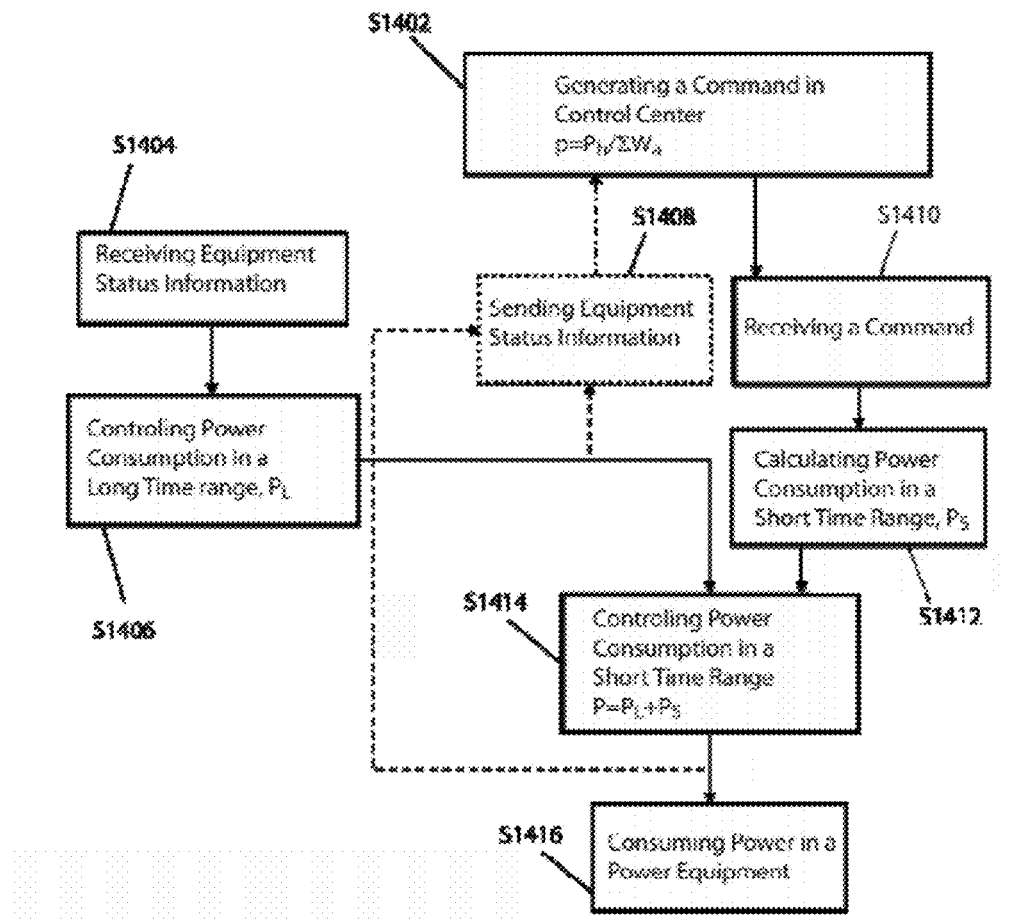
FIG. 14 is a diagram of processes in a control box which controls power consumption of a power equipment in a short time range and in a long time range in an embodiment D when a control center sends a common command to all control boxes, and when a power equipment has only ON or OFF power consumption levels.

In embodiment D, a control system of matching a variation of total power consumption in a short time range to a high frequency component of a total generated power is different from that in embodiment A as follows:
a4) a control center sends a common value to all power boxes which controls power equipments. An example of a common value is a fraction, p, of a high frequency component of a total generated power, $P_h$, to a sum of maximum power consumption in power equipments, $\Sigma W_a$. Here p is given by $P_h/\Sigma W_a$.
b4) a power equipment has only ON or OFF power consumption levels, rather than having a variable power consumption level between 0% (OFF) and 100% (fully turned ON), and
c4) processes to be performed in a control box according to this embodiment are shown in FIG. 14. FIG. 14 is a diagram of processes in a control box which controls power consumption of a power equipment in a short time range and in a long time range in the embodiment D when a control center sends a common value as a command to all control boxes which controls power equipment and when a power equipment has only ON or OFF power consumption levels.

In a process S1404, information of a power equipment status is received by a control box. In a process S1406, a control box determines a control variable $P_L$ on a level of power consumption in a long time range. Here $P_L$ is 0 (OFF) or 1 (ON).

S1402 is a process that a common fraction, p ($=P_h/\Sigma W_a$), is generated in a control center. In a process 1410, a common fraction p is received by a control box. In a process S1412, a control variable, $P_S$, is generated in a control box. An example of processes to generate a control variable in a short time range, $P_S$, is described later. In a process S1414, a sum of control variables, P, is calculated by adding a control variable $P_L$ in a long time range and a control variable $P_S$ in a short time range. An added control variable P is ON when $(P_L+P_S)$ is positive, and P is OFF when $(P_L+P_S)$ is 0 or negative. In a process P1416, an added control variable P is realized in a power consumption in a power equipment.

Figure 15:
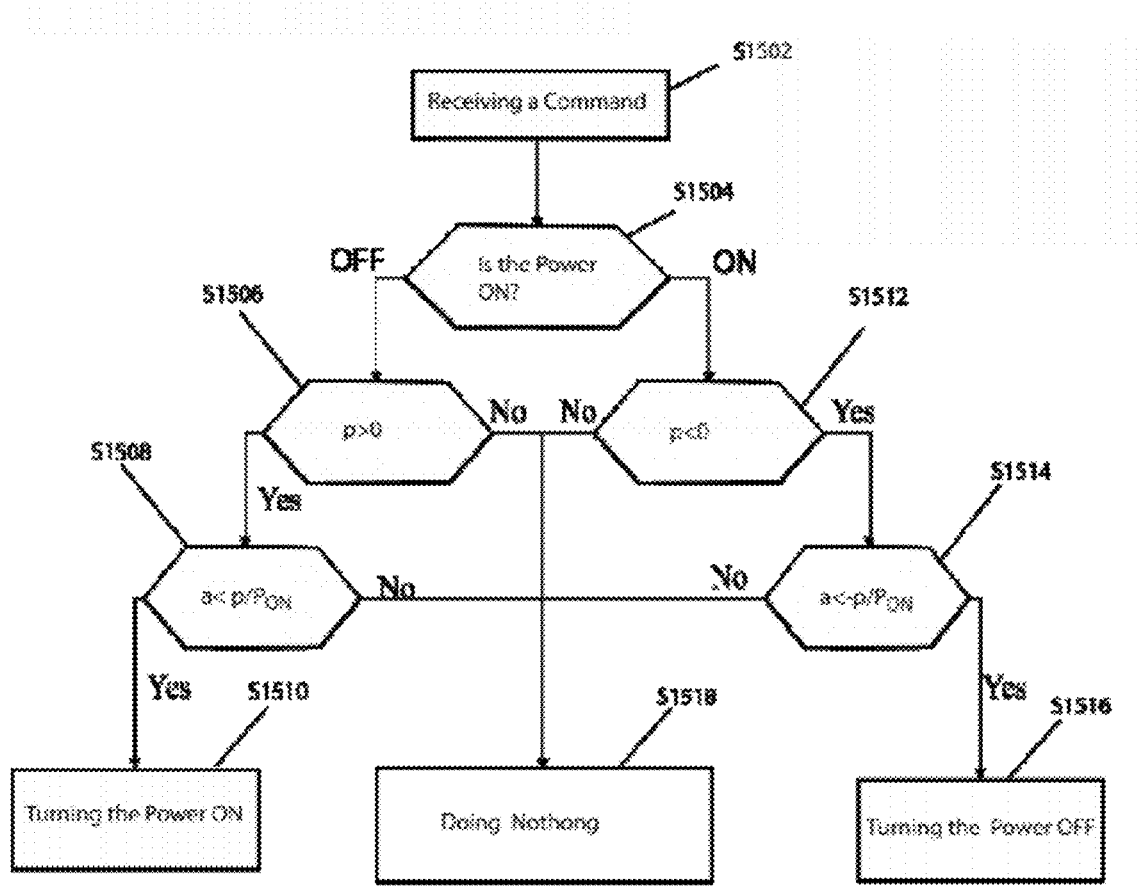
FIG. 15 is a diagram of processes in a control box which determines a control command to a power equipment in a short time range in the embodiment D.

FIG. 15 is a diagram showing processes to generate a control variable in a short time range, $P_S$. In a process S1502, a common fraction number p (p is $P_h/\Sigma W_a$, for example) is received by a control box. A random number a ($0 \leq a \leq 1$) is generated or renewed in every several hours in a control box. In a process 1504, a decision flow is branched on a condition whether a current power status of a power equipment is ON or OFF. A fraction of power equipments which is turned ON among all power equipments is stored as $P_{ON}$ ($0 \leq P_{ON} \leq 1$) in each control box.

If a power status is OFF in a process S1504, in a following process S1506, a decision flow is branched on a condition whether a fraction number p is positive (when a total generated power in a short time range is larger than a low frequency component of a total generated power) or not. If p is positive in a process S1506, in a following process S1508, a decision flow is branched on a condition whether a random number a is smaller than $p/P_{ON}$ or not. If a random number a is smaller than $p/P_{ON}$, a control variable $P_S$ is set to be 1 (turning ON). If random number a is equal to or larger than $p/P_{ON}$ in a process S1508, $P_S$ is set to be 0 (doing nothing). If p is 0 or negative in a process S1506, $P_S$ is set to be 0 (doing nothing) in a process S1518.

If a power status is ON in a process S1504, in a following process S1512, a decision flow is branched on a condition whether a fraction number p is negative (when a total generated power in a short time range is smaller than a low frequency component of a total generated power) or not. If p is negative in a process S1512, in a process S1514, a decision flow is branched on a condition whether a random number a is smaller than $(-p/P_{ON})$ or not. If a random number a is smaller than $(-p/P_{ON})$, a control variable $P_S$ is set to be −1 (turning OFF). If random number a is equal to or larger than $(-p/P_{ON})$ in a process S1514, $P_S$ is set to be 0 (doing nothing). If p is 0 or positive in a process S1512, $P_S$ is set to be 0 (doing nothing) in a process S1518.

There exists an alternative method to control a power consumption of a power equipment by changing a frequency of a supplied AC power to a power equipment when a power equipment is ON. A control center controls a power consumption of a power equipment variably only when a power equipment is ON. This way of controlling a power consumption of a power equipment is called as a hybrid method. This scheme can be also implemented in Embodiments A-D described above.

(5) Embodiment E

In embodiment E, a control system of matching a variation of total power consumption in a short time range to high frequency components in the fluctuations of a total generated power is different from that in embodiment A by the following:

a5) communication between a control center and a control box is disabled, and b5) by using a system frequency detector of a household AC power source, a control command for power consumption in a short time range is generated inside a consumer's house.

Figure 16:
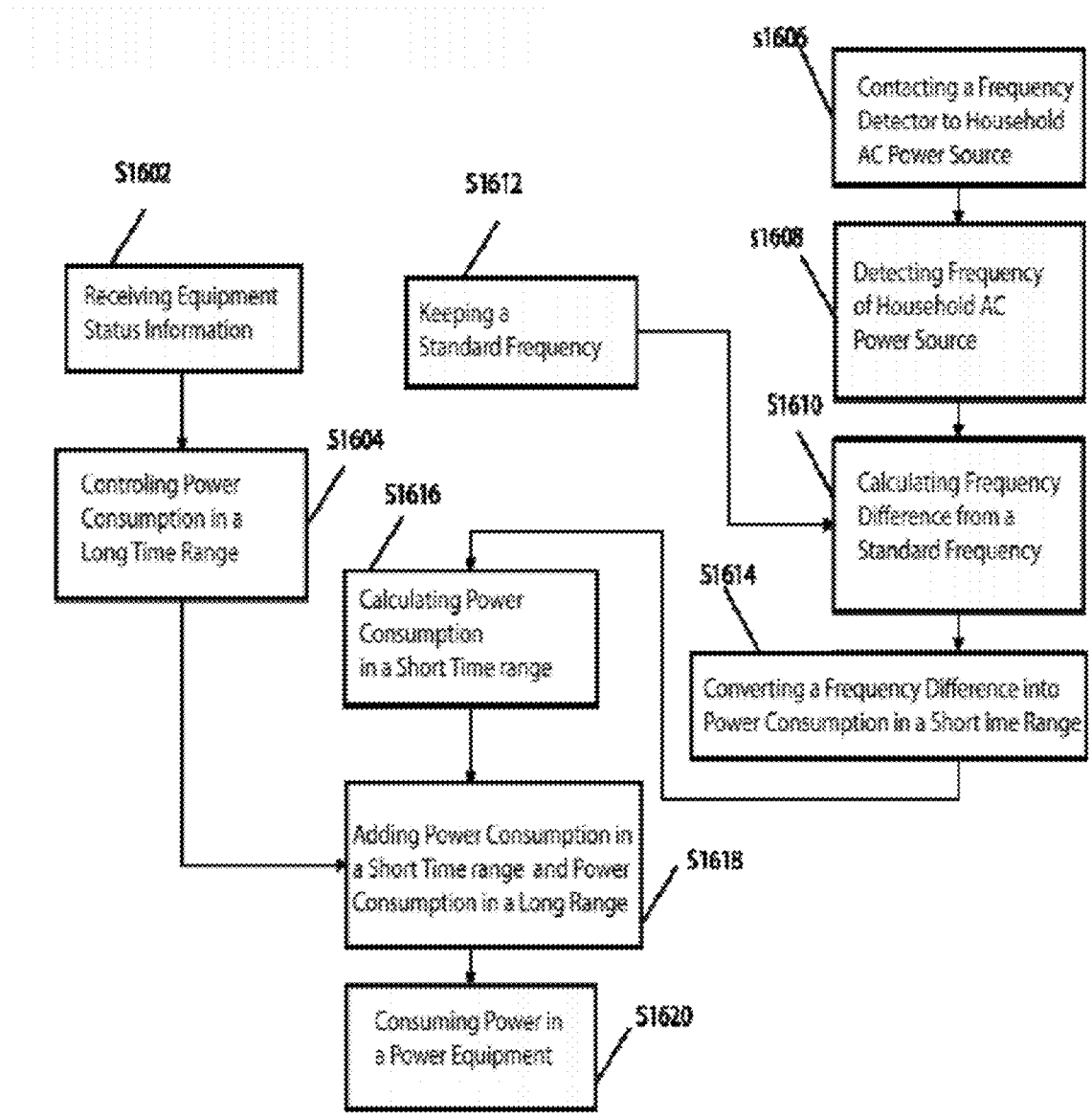
FIG. 16 is a diagram of processes in a control box which controls power consumption of a power equipment in a short time range and in a long time range in an embodiment E when communication between a control center and each control box is disabled, and when a power equipment has a variable power consumption level between 0% (OFF) and 100% (fully turned ON).

FIG. 16 is a diagram of processes of a control box in a consumer's house. In a process S1602, information on a power equipment is received by a control box. In a process S1604, a power consumption level w ($0 \leq w \leq W_a$) in a long time range is determined by a control box.

In a process S1606, a frequency detector is attached to a household AC power source. In a process S1608, the system frequency, f, of a household AC power source is measured. In a process S1612, a standard system frequency, $f_s$, is kept. In a process S1610, a frequency difference, $f_d$ ($=f-f_s$), of a household AC power source from the standard frequency is calculated. In a process S1614, a conversion number λ is multiplied to a frequency difference from the standard frequency to generate a fraction p ($-1 \leq p \leq 1$) of power consumption similar to p ($=P_h/\Sigma W_a$) in an embodiment C. In a process S1616, a corrected fraction of power consumption, $p_a$, in a short time range is calculated in the same way as in the embodiment C. In a process S1618, a power consumption level, w, in a long time range is added to a product of a corrected power consumption level and maximum power consumption, $p_a \cdot W_a$, in a short time range. Here $W_a$ is maximum power consumption of a power equipment. In a process S1620, an added power consumption level, ($w+p_a \cdot W_a$), is realized in a power equipment.

According to this embodiment even when the connection with the control center is disabled or non-existence, by monitoring the system frequency of the power outlet, individual adjustment of the power consumption is achieved in the direction that tends to offset the current status of the overall power generation and consumption imbalance. Thus, this system can be a useful supplement to any of other embodiments described herein, or it can be used as a stand alone equipment.

(6) Embodiment F

In embodiment F, a control system of matching a variation of total power consumption in a short time range to a high frequency component of a total generated power is different from that in embodiment A by the following:

a6) communication between a control center and a control box is disabled, b6) a power equipment has only ON or OFF power consumption levels, and c6) by using a frequency detector of a household AC power source, a control command for power consumption in a short time range is generated inside a consumer's house.

Figure 17:
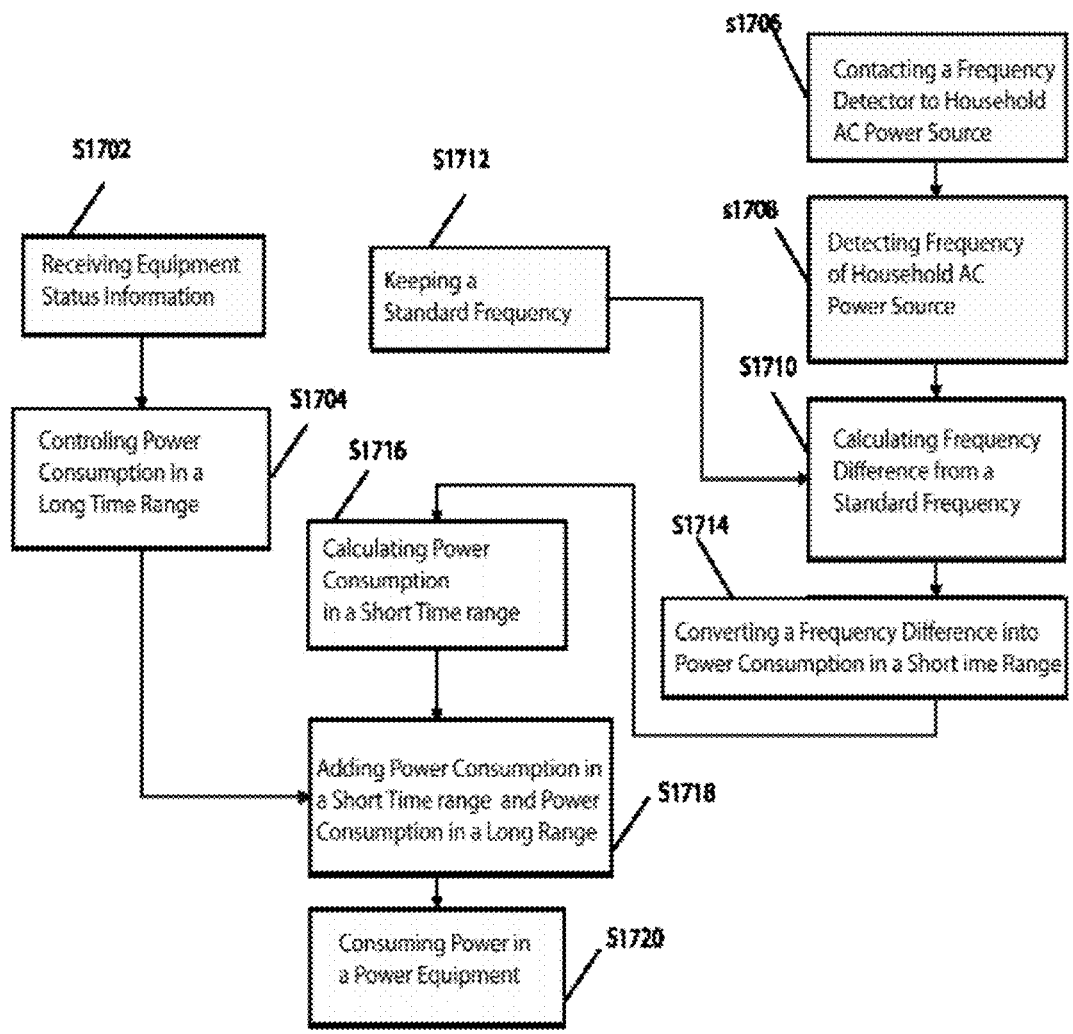
FIG. 17 is a diagram of processes in a control box which controls power consumption of a power equipment in a short time range and in a long time range in an embodiment F when communication between a control center and each control box is disabled, and when a power equipment has only ON or OFF power consumption levels.

FIG. 17 is a diagram of processes in a consumer's house. In a process S1702, information on a power equipment is received by a control box. In a process S1704, a power consumption level $P_L$ (0: OFF or 1: ON) in a long time range is determined by a control box.

In a process S1706, a system frequency detector is attached to a household AC power source. In a process S1708, the system frequency, f, of a household AC power source is measured. In a process S1712, a standard system frequency is kept. In a process s1710, a frequency difference, $f_d$, of a household AC power source is calculated. In a process S1714, a conversion number λ is multiplied to a frequency difference from a standard frequency to generate a fraction p ($-1 \leq p \leq 1$) of power consumption similar to p ($=P_h/\Sigma W_a$) in an embodiment D. In the similar way to the embodiment D, a random number a ($0 \leq a \leq 1$) is generated/renewed in every several hours in a control box. In a process S1716, a control variable in a short time range, $P_S$, is calculated in similar way to a way using an example algorithm in FIG. 15. In a process S1718, a power consumption level, $P_L$, in a long time range is added to a power consumption level $P_S$ in a short time range to create a control variable P. An added control variable P is ON when ($P_L+P_S$) is positive, and P is OFF when ($P_L+P_S$) is 0 or negative. In a process S1720, an added power consumption level P is realized in a power equipment.

There exists an alternative method to control a power consumption of a power equipment by changing a frequency of a supplied AC power to a power equipment. A control center controls a power consumption of a power equipment variably only when a power equipment is ON. This way of controlling a power consumption of a power equipment is called as a hybrid method. This system can be implemented in this embodiment as well.

(7) Embodiment G

In one aspect of embodiment G, the control center runs a simulation on how the power consumption will vary assuming a set of commands are forwarded to respective control boxes. In doing this simulation, the control center can use various information pieces that can be received from the control boxes and/or that can be already known and stored in a memory, for example. The control center can utilize the operation history of the power equipments, such as when they were turned ON or OFF last time, and how soon they are likely to be turned OFF or ON again, as well as the power consumption characteristics of the power equipments under control. Using these types of the information, the control center can run a reliable simulation on how the power consumption will change and how a particular set of commands will affect the power consumption. Here, however, the simulation should be conducted on an averaged basis that is averaged over a few to several feedback processing steps in order to provide for a stable feedback system. Also the response time of the power equipments and communication time lag (such as the latency) of the communication channels should be taken into account. Otherwise, the simulated results may cause unstable fluctuations or non-converging feedback due to overfitting, which is not desirable.

There are various types of the information which the control center can utilize in running this simulation. In a power equipment which uses an electric motor, for example, power consumption has a peak right after a power equipment is turned ON due to an inrush current to an electric motor. This peak can be smoothed to some extent by turning on a number of power equipments, which use electric motors, that have different response times to the ON commands so that all the power equipments are not turned on at the same time. However, in many cases, the peak shape and how the power consumption is stabilized for a particular power equipment can be predicted by analyzing the history of the power consumption data (which can be transmitted to the control center from the control box) or otherwise can be obtained by the manufacture provided specification or other separate measurements. Then, knowing the history and current situation of those power equipments (based on the information from the control box, for example), the control center can analyze quite accurately how those power equipments' respective power consumptions will change in time for a certain period of time. Therefore, the control center can sum up these consumption data and with respect to those power equipments, it can quite accurately predict (or in other words, run a simulation on) the total future power consumption thereof for the time being.

Each power equipment has its own typical time intervals from a time of being turned ON to a time of being turned OFF, and from a time of being turned OFF and to a time of being turned ON. Expected time intervals can be calculated by selecting significant time intervals based on measurement of a number of those time intervals. It is considered to be more efficient to make a change of power consumption level in a short time during a time range when a power equipment is close to expected to make a change of power consumption level. In this embodiment, when there exists bi-directional communication between a control center and a control box, a control center receives from a control box, or otherwise obtains, the following information of a power equipment, for example:

(1) a current power consumption level.
(2) a difference between a power consumption level when a last command was issued to a power box and a current power consumption level.
(3) an elapsed time from a time when the last change of power consumption was made.
(4) an expected time when power consumption level is to be changed next time in a long time range.
(5) an expected change in power consumption based on known or analyzed power consumption characteristics (such as how the power consumption will behave right after it is turned on, for example).

Based on some of or all of these pieces of the information, the control center makes a selection of power equipments to change power consumption level in a short time range based on the closeness to the expected time when the next change of power consumption level is expected to be made in a long time range, for example.

In embodiment G, a control system of matching a variation of total power consumption in a short time range to a high frequency component of a total generated power is different from that in embodiment B by the following:

(a7) A control center is updated on the status information of all power equipments on expected time when power consumption level is to be changed next time in a long time range by receiving information of power equipments from control boxes.

(b7) In a process S908 in FIG. 9, a control center arranges power equipments in a short-to-long order of expected length of time of being OFF until a power equipments are turned ON in a long time range. Then the control center simulates to turn ON (add) power equipments one by one in consideration of response time of power equipments in a short-to-long order of expected length of time of being OFF before a power equipment is turned ON, until an amount of increase of power consumption by turning ON power equipments exceeds the high frequency components of a total generated power. Then a control center selects those power equipments which were turned ON in the simulation as power equipments to be turned ON in a command which are sent to control boxes.

(c7) In a process S912 in FIG. 9, a control center arranges power equipments in a short-to-long order of expected length of time of being ON until a power equipments are turned OFF in a long time range. Then a control center simulates to turn OFF (remove) power equipments one by one in consideration of response time of power equipments in a short-to-long order of expected length of time of being ON before a power equipment is turned OFF, until an absolute value of decrease of power consumption by turning ON power equipments exceeds the absolute value of high frequency components of a total generated power. Then a control center select those power equipments which were turned OFF in the simulation as power equipments to be turned OFF in a command which are sent to control boxes.

(d7) By using information of expected length of time being ON (when it is ON) before being turned OFF, and an expected length of time being OFF (when it is OFF) before being turned ON, and a set of selected power equipments to be turned ON or OFF in a next cycle of command, the control center can predict total power consumption of power equipments in a current command cycle and in a following several command cycles. This prediction can be used as a baseline model of total power consumption by power equipments which may be used indirectly in selecting power equipments to change power consumption levels in a short time range.

Furthermore, if available, by utilizing the known or analyzed power consumption characteristics of each power equipment (such as how the power consumption will behave after the initial peak due to the inrush current as described above), the control center can run a reliable simulation on power consumption, thereby enabling efficient and effective feedback control/matching of the high frequency component of the generated power to the power consumption.

Figure 18:
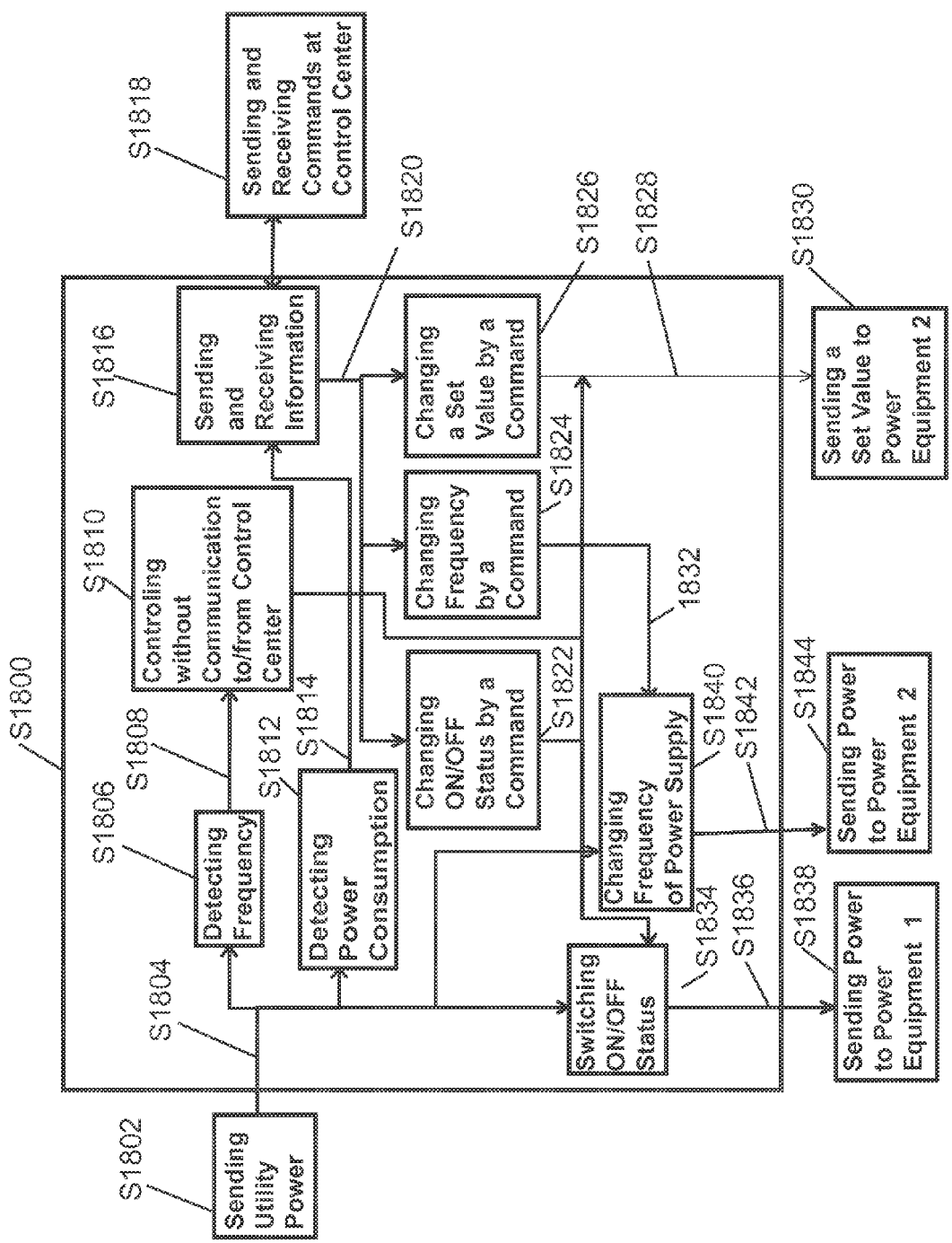
FIG. 18 is a diagram of processes in a control box which controls power consumption of a power equipment in a short time range and in a long time range in an embodiment G in cases where communication exists and does not exist between a control center and each control box, and when a power equipment has only ON or OFF power consumption levels.

A diagram showing processes that are performed in a control box according to some of the above-described embodiments is shown in FIG. 18. S1800 shows a combined processes in a control box. The details of the some of the processes/functions described above will also be provided with reference to this example.

In FIG. 18, S1802 shows a process of sending the utility power to a control box. S1804 is a process of transmitting the utility power. The system frequency is detected in a process S1806. S1808 is a process of transferring the measured system frequency. S1810 shows a process to control a power equipment when communication between a control center and a control box is disabled. S1812 shows a process to detect an amount of power consumption by a power equipment. S1814 is a process of transferring information of the amount of power consumption. S1816 shows a process of sending and receiving information to and from a control center. S1818 is a process of sending and receiving commands at a control center. S1820 shows a process of transferring a control command. S1822 shows a process of sending a control command to change ON or OFF status of a power equipment. S1824 shows a process of sending a control command to change a frequency of a power supply to a pre-determined frequency. S1832 show a process of transferring a control command to change a frequency of a power supply. S1826 shows a process of sending a control command to change a set value of a power equipment. S1828 is a process of transferring a control command to change a set value of a power equipment. 1830 is a process of sending a set value to a power equipment 2 which has a set value to be changed. S1834 is a process of switching ON/OFF status of a power supply 1 which has only On or OFF power consumption level. S1836 is a process of transmitting the utility power to a power equipment 1. S1838 is a process of sending utility power to a power equipment 1. S1840 is a process of changing a frequency of a power supply. S1842 is a process of transmitting a supplied power which frequency was modified in a process 1840. S1844 shows a process of sending a supplied power which frequency was modified in a process 1840.

In this example, the system frequency is detected as follows:
1) Measuring a time difference between a time when a voltage waveform gives a peak of a sine wave form and a time when a voltage waveform gives a peak of a sine wave form in a following cycle, or
2) measuring a time difference between a time when a voltage changes from positive to negative through a threshold value and a time when a voltage changes from positive to negative through a threshold in a following cycle.
3) A voltage wave form is first converted into a digital waveform with a fixed sampling frequency by using a microcomputer, for example.
4) A time corresponding to a peak value is obtained by finding a time which gives a maximum of a voltage wave form in proximity of a peak. For a voltage waveform at a 60 Hz, for example, a maximum value is obtained in a time range of 1/60 second. A time range of 1/60 second is located to include a peak in the middle by predicting a time for a peak by using a time for a previous peak.
5) The best time range is a time range corresponding to a voltage waveform at around 0 V to measure a time when a voltage changes from positive to negative through a threshold value, because an absolute value of a slope of a voltage waveform is the largest there. To avoid multiple crossing of a threshold value around 0 V of a voltage waveform due to a noise, a digital waveform can be processed through a filtering process, a process to give hysteresis to a voltage waveform, a process to pick up a first crossing over a threshold and not to pick up any following crossing over, for example.

Detecting an amount of power consumption is done as follows:
1) Measuring a voltage value, v(t), and a current value, i(t), in a fixed interval.
2) An amount of power consumption, w(t), is given by;

$w(t)=v(t) \cdot i(t)$, where $w(t)$ is an effective value.

3) Measuring w(t) which changes from moment to moment and a sum of w(t) in a certain time range, $w=\Sigma w(t)$.
4) Various kinds of circuits to measure an amount of power consumption can be used. An example of measuring a real-time consumption value is to use a toroidal coil or a shunt resistance.

When communication between a control center and a control box is disabled, controlling a power equipment in a short time range is done in the following:
1) Controlling a power equipment is done by control commands of changing ON/OFF status, changing a power supply frequency (an inverter control), and changing a set value right before the communication between a control center and a control box is disabled, which was last set when bi-directional communication exists between a control center and a control box.
2) Controlling is done by detecting a shift of the system frequency from the standard system frequency, for example. A system frequency shifts from a standard frequency when a balance between supply and demand in the utility power system is lost.
3) Actual controlling is done as follows, for example:
(i) ON/OFF control is done by using threshold values which change as a function of time and which are assigned to each power equipment. Threshold values are randomly distributed so that total power consumption does not change in a short time span.
(ii) Controlling by changing a set value is basically the same as ON/OFF control. ON/OFF control is done by changing a set value. For example, when a set value of a room temperature is 20 deg C., an air conditioner can be turned OFF by setting a set value of a room temperature at 30 deg C. for a short period of time, and in contrast, an air conditioner can be turned ON by setting a set value of a room temperature at 10 deg C. for a short period of time.
(iii) Controlling a frequency of power supply is done by changing a frequency of two-phase or three-phase power supply. Difference of a frequency of a power supply from a utility power, fu, is given by;
fu=$\Delta f \cdot \mu$, where $\Delta f$ is a shift of a system frequency from a standard frequency, and m is a constant which is an empirical value for a power equipment.
4) An emergency situation is assumed in controlling a power equipment when communication between a control center and a control box is disabled.
5) A system frequency can be stabilized by having power equipments having above mentioned functions. For example, total power consumption by power equipments is reduced even if reduction of supplied power is experienced.
6) Controlling a power equipment in a short time range when communication between a control center and a control box is disabled, is a feedback control of utility power system including system power supplies, for example.

Switching in a process S1834 is done by using a relay or a TRIAC which allows ON/OFF control by a command signal, for example.

Changing a frequency of a power supply may be done by using an inverter circuit. Basically, AC power from utility power is converted into DC power by using bridge circuits and capacitors, for example, and then is converted into Ac power by using a switching circuit.

Sending and receiving commands to/from a control center are done by using existing Internet or wireless connection, for example. A command signal is often coded for the security reason in the sending side, but it is then decoded in the receiving side. When there exists bi-directional communication through an Internet connection, for example, between a control center and a control box, a control center receives following information of a power equipment from a control box, for example:
(1) a current power consumption level,
(2) a difference between a power consumption level when a last command was issued to a power box and a current power consumption level,
(3) an elapsed time from a time when the last change of power consumption was made, and
(4) an expected time when power consumption level is to be changed next time in a long time range.

In case of using one-directional communication such as wireless communication, controlling a power equipment is done by using a probability upon receiving a command.

A target for total power consumption by power equipments to be matched to a low frequency component of total generated power varies depending on how a high frequency component of total generated power including generated power by wind power generators, for example, is cut and how a peak of power demand is cut. Here a high frequency component of total generated power including generated power by wind power generators is considered. A target for total power consumption by power equipments is set at power consumption which can be matched and followed by power generators other than wind power generators. It is desirable to have separate targets for power consumption by power equipments controlled by ON/OFF control and by variable power consumption level control. If there exists a small number of power equipments controlled by ON/OFF control, a sum of power consumption by power equipments controlled by ON/OFF control cannot match a target for power consumption because of the intrinsic fluctuation. The difference between a sum of power consumption by power equipments controlled by ON/OFF control and a target for power consumption can be matched by using power consumption by power equipments controlled by variable power consumption level control. Since a sum of power consumption by power equipments controlled by ON/OFF control can be simulated by a control center, the difference between a sum of power consumption by power equipments controlled by ON/OFF control and a target for power consumption can be matched by using power consumption by power equipments controlled by variable power consumption level control.

When a control center arranges power equipments in a short-to-long order of expected length of time of being OFF or ON till a power equipments are turned ON or OFF respectively in a long time range, following factors are considered: 1) It is considered to be more efficient to make a change of power consumption level in a short time during a time range when a power equipment is close to an expected time of making a change of power consumption level. When it is not close to an expected time to make a change of power consumption level, for example for a refrigerator which was turned on a second ago, the internal air temperature is still relatively high. So it is not efficient to turn off a refrigerator which was turned on a second ago, because by using a thermostat of a refrigerator, control in a long time range will change a power consumption level to ON soon (It is not efficient to have many frequent ON and OFF cycles). When it is close to an expected time to make a change of power consumption level, a refrigerator is sufficiently cooled down, for enough time passed after it was turned ON. So turning it OFF in a short time range does not practically affect the internal air temperature; hence it is more efficient. But if it is too close to an expected time to make a change of power consumption level, it is difficult to predict power consumption, because changing of power consumption level in a long time range may happen in any second. So power equipments in a time range too close to an expected time to make a change of power consumption level should be removed from a candidate power equipment to be selected by a control center to change power consumption level in a short time range. Also power equipments in a time range far away from an expected time to make a change of power consumption level should be removed from a candidate power equipment to be selected by a control center to change power consumption level in a short time range because of the above mentioned reason.

In the present invention, some of or all of the aspects of the present invention described with reference to embodiments A, B, C, D, E, F, and G above can be appropriately combined to form a one large system. Thus various modifications and combinations of the above-described examples are possible. This can be done because in all of those embodiments, the systems are configured such that a variation of total power consumption by power equipments is matched to a high frequency component of a total generated power in a short time range by increasing or decreasing a fraction of a sum of maximum power consumption of power equipments or the like.

For example, a total consumption of power equipments in a short time period may be basically controlled by using methods in the embodiment A and the embodiment B. And as a fail-safe device, power consumption in a short time period by using a method in the embodiment A (when a power equipment has a variable power load level in a range between 0% and 100%, and a bi-directional communication exists between a control center and a control box) may be combined with the system of the embodiment E (when a power equipment has a variable power load level in a range between 0% and 100%, and a communication is temporary disabled between a control center and a control box). Further, power consumption in a short time period may be controlled by using the system of the embodiment B (when a power equipment has power load levels only at 0% or at 100%, and a bi-directional communication exists between a control center and a control box) and may be combined with the system of the embodiment F (when a power equipment has power load levels only at 0% or at 100%, and a communication is temporary disabled between a control center and a control box).

In the embodiment C (when a power equipment has a variable power load level in a range between 0% and 100%, and a control center sends a common value to all power boxes which controls power equipments) and in the embodiment D (when a power equipment has power load levels only at 0% or at 100%, and a control center sends a common value to all power boxes which controls power equipments), a control center communicates with a control box by using a radio communication which may be an one directional communication from a control center to a control box. In these embodiments, an amount of additive correction of power consumption by a power equipment is calculated in a control box.

In the embodiment E (when a power equipment has a variable power load level in a range between 0% and 100%, and a communication is disabled between a control center and a control box) and in the embodiment F (when a power equipment has power load levels only at 0% or at 100%, and a communication is disabled between a control center and a control box), a proportionality coefficient, $\lambda$, is a time constant which is determined by a sampling frequency and a response time in a real environment of a power equipment. $\lambda$ is obtained by measuring a time constant of the power supplying system as a function of a system frequency deviation from the standard system frequency, by changing an amount of power consumption of a power equipment. Because the system frequency deviates out of a predetermined range only in a crisis situation, there exists enough sensitivity to measure the proportionality coefficient, $\lambda$, by changing an amount of power consumption of a power equipment.

Examples of the power equipments that can be controlled in accordance with the present invention include not only heat pumps, refrigerators, and air conditioner type equipments, but also computer or other electric appliances. For example, by controlling the revolution speed of a servomotor for a hard disk and/or controlling consumption power of the CPU, the power consumption of a computer system can be controlled.

Furthermore, various aspects of the present invention as described above can be implemented by various hardware and/or software and actual design and construction of the systems will be well within the skills of those having ordinary skill in the field once given the above description of the present invention.

It will be apparent to those skilled in the art that various modification and variations can be made in the system, method and apparatus of the present invention without departing from the spirit or scope of the invention. Thus, it is intended that the present invention cover modifications and variations that come within the scope of the appended claims and their equivalents.

What is claimed is:

1. A control system of a power system for regulating a system frequency comprising:
   an electrical energy meter measuring a generated power of an electric power generator;
   a control box controlling a power equipment; and a control center being disposed in at least one location, said control center receiving information of said generated power from said electrical energy meter through an upstream communication channel connecting said electrical energy meter and said control center, said control center calculating a total generated power of said electric power generator, said control center extracting a high frequency component of said total generated power of said electric power generator, said control center communicating with said control box through a command communication channel, said control center matching a variation of total power consumption of said power equipment to an amount of said high frequency component of said total generated power of said electric power generator.

2. The control system of claim 1 wherein said power equipment is individually controlled by said control center via a bi-directional communication between said control center and said control box.

3. The control system of claim 1 wherein said power equipments are controlled by a common command from said control center via a one-directional communication from said control center to said control box.

4. The control system of claim 1 wherein said power equipment is controlled by said control box when said command communication channel is disabled.

5. The control system of claim 1 wherein said power equipment has a variable power consumption level in a range between 0% and 100% of a maximum power consumption.

6. The control system of claim 1 wherein said power equipment has either 0% or 100% of a maximum power consumption level.

7. The control system of claim 1 wherein a plurality of said electrical energy meters are installed.

8. The control system of claim 1 wherein said control box controls power consumption by turning a power of said power equipment ON and OFF.

9. The control system of claim 1 wherein said control box controls power consumption by changing a voltage of a supplied AC power to a power equipment.

10. The control system of claim 1 wherein said control box controls power consumption by modifying a waveform of a supplied AC power to said power equipment.

11. The control system of claim 1 wherein a power consumption of said power equipment is controlled by controlling a temperature setting of an appliance.

12. The control system of claim 1 wherein said power equipment is a servomotor by which hard disk's revolution speed is controlled.

13. The control system of claim 1 wherein said power equipment is a servomotor in which power consumption is controlled by controlling an activation process.

14. The control system of claim 1 wherein a power consumption of said power equipment is controlled by changing a frequency of a supplied AC power to a power equipment when a power of said power equipment is ON.

15. The control system of claim 2, wherein said control center obtains information on an expected time when power consumption level of a power equipment is to be changed next time based on information received from said control box.

16. The control system of claim 15, wherein said control center selects power equipments to change power consumption levels based on said expected time of changing said power consumption level of said power equipments.

17. The control system of claim 2, wherein said control center make a prediction of said total power consumption by said power equipments by using at least one of said expected time of changing power consumption level of said power equipments and predicted power consumption characteristics for said power equipments.

18. The control system of claim 6, wherein said controlling ON or OFF power consumption level is done by changing a set value for said power equipment.

* * * * *